(12) United States Patent
Nakamura et al.

(10) Patent No.: US 7,674,064 B2
(45) Date of Patent: Mar. 9, 2010

(54) COUPLING APPARATUS FOR STRUCTURAL MEMBERS

(75) Inventors: Tetsuya Nakamura, Otawara (JP); Akira Horimoto, Tochigi (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/325,571

(22) Filed: Dec. 1, 2008

(65) Prior Publication Data

US 2009/0087256 A1    Apr. 2, 2009

Related U.S. Application Data

(60) Division of application No. 10/965,798, filed on Oct. 18, 2004, now Pat. No. 7,473,048, which is a continuation of application No. PCT/JP03/05010, filed on Apr. 18, 2003.

(30) Foreign Application Priority Data

Apr. 18, 2002    (JP) ............... 2002-116188

(51) Int. Cl.
  *F16B 21/02* (2006.01)
(52) U.S. Cl. ..................... 403/348; 403/349
(58) Field of Classification Search .......... 403/56, 403/76, 90, 122–144, 348–353; 137/614.02–614.06; 135/87–120.4; 285/261–271
See application file for complete search history.

(56) References Cited

U.S. PATENT DOCUMENTS

| | | |
|---|---|---|
| 2,948,553 A | 8/1960 | Gill et al. |
| 3,159,180 A | 12/1964 | Courtot et al. |
| 3,201,151 A | 8/1965 | Westveer |
| 3,217,746 A | 11/1965 | Voisine |
| 3,635,435 A | 1/1972 | Perison, Sr. |
| 3,766,932 A | 10/1973 | Sidis et al. |
| 3,776,649 A | 12/1973 | Kemezys |

(Continued)

FOREIGN PATENT DOCUMENTS

DE           380786          9/1923

(Continued)

OTHER PUBLICATIONS

Technical Research Report of Shimizu Corporation, vol. 65, 1997, 4 (Published Japan), relevant pages attached along with a concise explanation of relevance.

(Continued)

*Primary Examiner*—Victor MacArthur
(74) *Attorney, Agent, or Firm*—Nixon & Vanderhye P.C.

(57) ABSTRACT

The coupling apparatus for structural members includes a paired couplers for coupling structural members with each other, and each coupler includes a cylindrical main body, engaging projections spaced apart from each other at predetermined intervals in a circumferential direction at an end of the body and projecting along the center line of the body, and engaging hooks projecting in one circumferential direction at the projecting end portions of the projections. At least one coupler further includes a coupling direction changing mechanism which couples the at least one coupler with a predetermined position of a structural member corresponding thereto so that the center line of the body of the at least one coupler can be orientated in a desired direction.

3 Claims, 12 Drawing Sheets

U.S. PATENT DOCUMENTS

| | | | |
|---|---|---|---|
| 4,121,893 A | 10/1978 | Morissette | |
| 4,438,779 A | 3/1984 | Allread | |
| 4,518,277 A | 5/1985 | Bush et al. | |
| 4,756,638 A | 7/1988 | Neyret | |
| 5,069,572 A | 12/1991 | Niksic | |
| 6,877,709 B2 | 4/2005 | March et al. | |

FOREIGN PATENT DOCUMENTS

| | | |
|---|---|---|
| EP | 0 770 809 | 5/1997 |
| EP | 1 024 323 | 8/2000 |
| JP | 35-1070 | 1/1960 |
| JP | 09-280454 | 10/1997 |
| WO | WO 93/06408 | 4/1993 |

OTHER PUBLICATIONS

Technical Research Report of Shimizu Corporation, vol. 64, 1996, 10 (Published Japan), relevant pages attached along with a concise explanation of relevance.

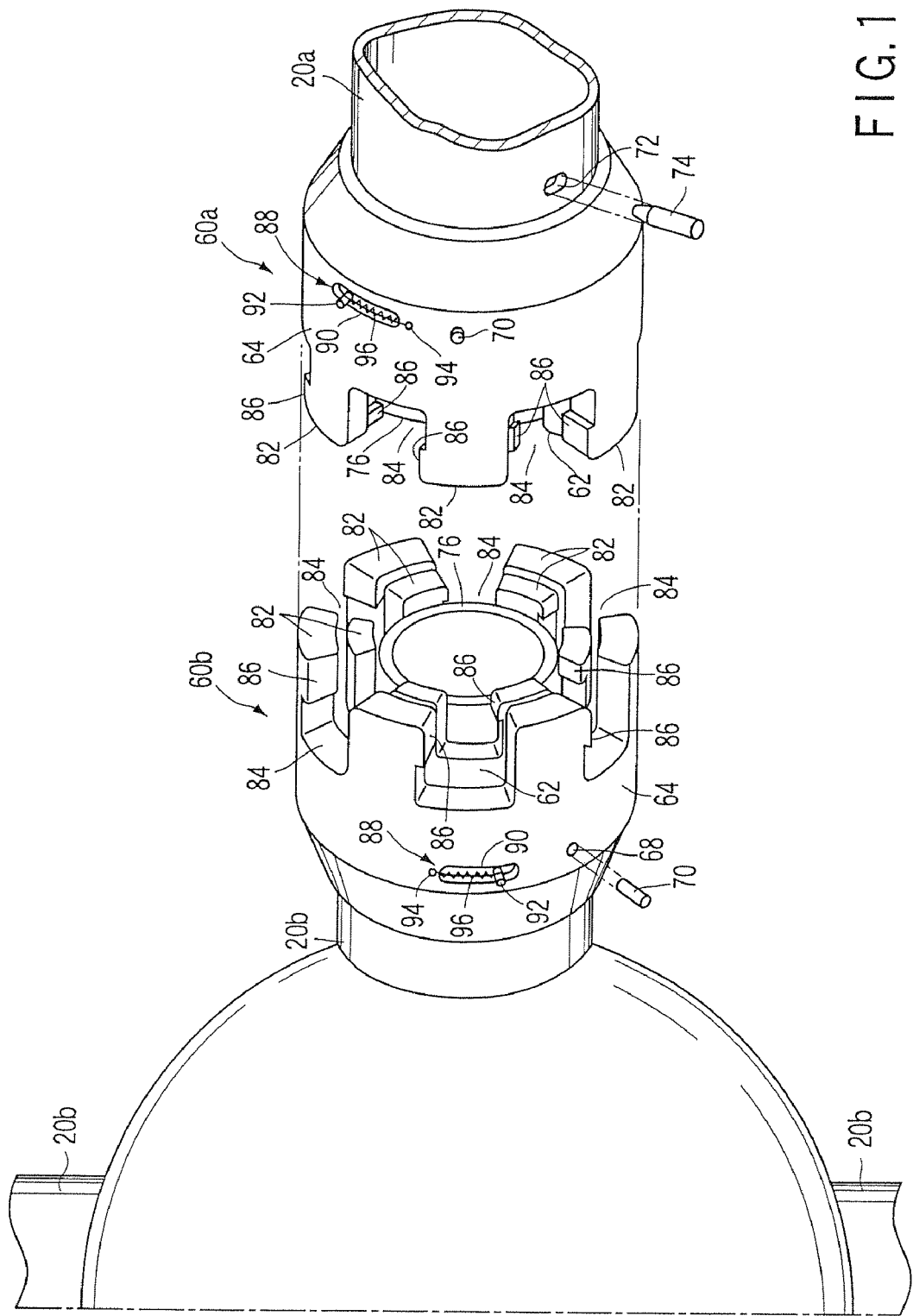
F I G. 1

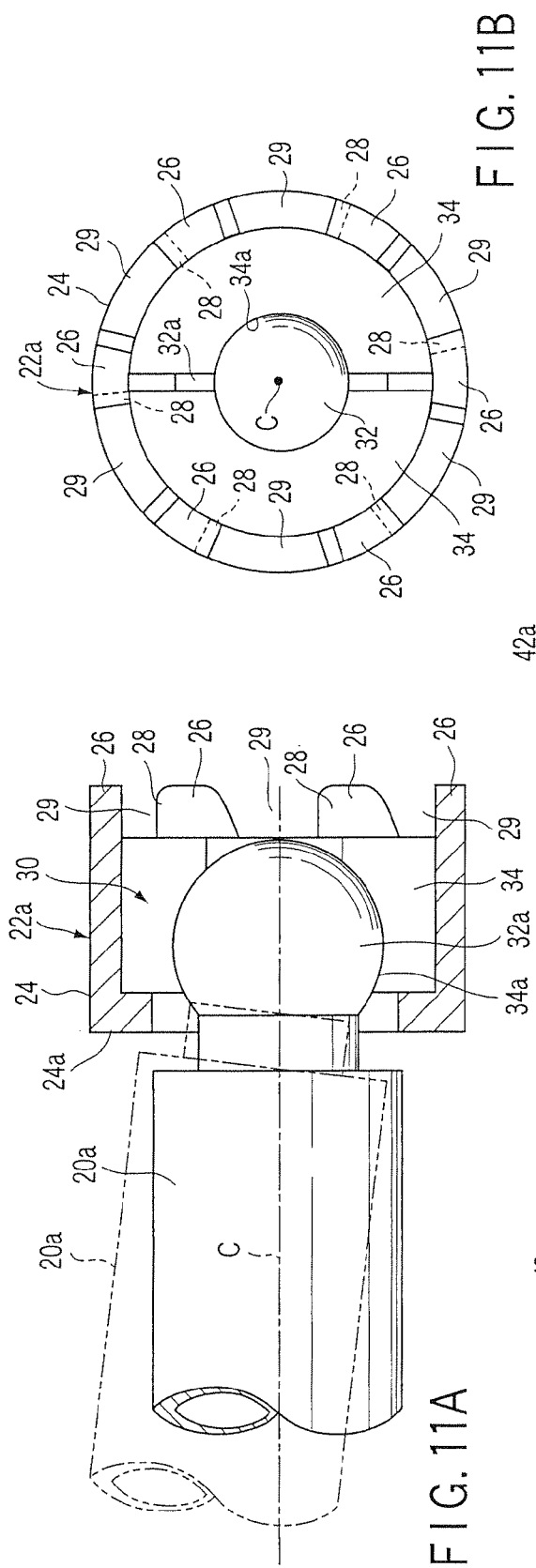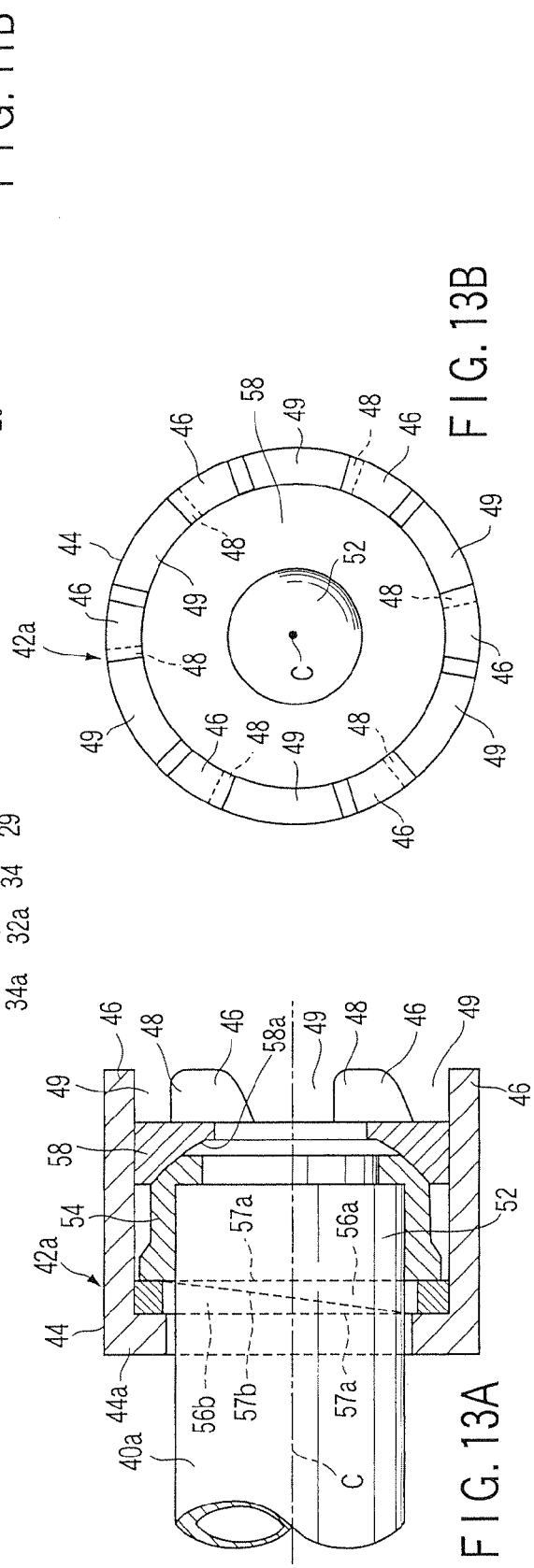

COUPLING APPARATUS FOR STRUCTURAL MEMBERS

CROSS-REFERENCE TO RELATED APPLICATIONS

This application is a divisional of U.S. patent application Ser. No. 10/965,798, filed Oct. 18, 2004 now U.S. Pat. No. 7,473,048, which is a continuation of PCT Application No. PCT/JP03/05010, filed Apr. 18, 2003, which was published under PCT Article 21(2) in Japanese, the entire contents of each of which are hereby incorporated by reference in this application.

This application is based upon and claims the benefit of priority from prior Japanese Patent Application No. 2002-116188, filed Apr. 18, 2002, the entire contents of which are incorporated herein by reference.

BACKGROUND OF THE INVENTION

1. Field of the Invention

The present invention relates to a coupling apparatus for structural members, including a pair of couplers which couples structural members independent of each other with each other.

2. Description of the Related Art

It is known well to assemble a large construction by coupler a plurality of structural members independent of each other.

A truss construction, for example, is well known as that construction. Conventional truss constructions are assembled with a plurality of structural members independent of each other by coupling apparatuses that use welding or fixing members such as bolts and the like.

For example, Research Report of Shimizu Corporation (Vol. 65, 1997, 4) discloses a coupling apparatus for coupling a plurality of truss structural members with each other making use of bolts.

As shown in FIG. 17A, the conventional coupling apparatus includes nose cones 12 of stainless steel mounted on predetermined positions, or both ends of a tubular truss structural member 10 formed of CFRP (Carbon Fiber Reinforced Plastic) by, for example rivets not shown. Each of the nose cones 12 has a truncated-conical shape, and a high tension steel bolt 14 is screwed into the nose cone 12 from the inner hole of the tubular truss structural member 10. The portion of the shaft of the bolt 14 projected from the nose cone 12 is covered with an aluminum alloy collar 16. A fixing pin 14e is studded in the above described portion of the shaft of the bolt 14, and a longitudinal groove 16a extending in a direction in which the shaft of the bolt 14 extends is formed on the inner peripheral surface of the collar 16. The fixing pin 14e of the shaft of the bolt 14 projects into the longitudinal groove 16a on the inner peripheral surface of the collar 16.

The conventional coupling apparatus further includes a spherical node member 18. A screw hole 18a is formed at a predetermined position of the outer peripheral surface of the node member 18 as well as a recess 18b is formed at an inlet of the screw hole 18a.

After the projecting end of the shaft of the bolt 14 is aligned with the inlet of the screw hole 18a at the predetermined position of the outer peripheral surface of the node member 18, the collar 16 is rotated in a predetermined direction. With this operation, the bolt 14 is also rotated in the predetermined direction together with the collar 16, thereby the shaft of the bolt 14 is screwed into the screw hole 18a. The shaft of the bolt 14 is continuously screwed until the fixing pin 14e thereof is accommodated in the recess 18b of the inlet of the screw hole 18a. When the fixing pin 14e has been accommodated in the recess 18b, the bolt 14 can not be rotated by the collar 16.

In the conventional coupling apparatus assembled as described above, compression force exerted between the tubular truss structural member 10 and the node member 18 is mainly supported by the collar 16, and tension force exerted between the tubular truss structural member 10 and the node member 18 is mainly supported by the bolt 14.

When a node member 18', in the outer peripheral surface of which four screw holes are formed on one imaginary circle with a maximum diameter at the same intervals, is prepared, the one ends of the four tubular truss structural members 10 can be coupled with the node member 18' as shown in FIG. 17B.

Further, when a node member 18", in the outer peripheral surface of which two screw holes are formed at desired two positions, is prepared, the one ends of the two tubular truss structural members 10 can be coupled with the node member 18" as shown in FIG. 17C.

An increase in size of a construction inevitably increases the number of structural members to be coupled with each other, which makes an assembling work for the construction being troublesome.

Moreover, in the above described conventional coupling apparatus, work for aligning the projected end of the shaft of the bolt 14 at the one end of the tubular truss structural member 10 with the inlet of the screw hole 18a at the predetermined position on the outer peripheral surface of the node member 18 is very troublesome, and work for rotating the collar 16 in the predetermined direction to screw the shaft of the bolt 14 into the screw hole 18a is also very troublesome. Further, after the bolt 14 is screwed into the screw hole 18a as desired, the bolt 14 cannot be released from the screw hole 18a.

The troublesome work for assembling a construction using the conventional coupling apparatus as described above becomes more troublesome when the above assembling work is performed in an unstable environment, such as on a body floating on water, or in underwater, aerospace, or the like.

Moreover, in the above described conventional coupling apparatus, the assembling work becomes difficult unless dimensional accuracy is strictly controlled, and the assembling work becomes furthermore difficult when elements that constitute the structural member and the coupling apparatus are exposed to external environments of high temperature and low temperature, in which the elements are thermally expanded and contracted, for a long period.

Further, in the above environment, even after the assembling work is finished, the coupling apparatus is greatly deformed due to the thermal expansion and contraction of the elements that constitute the structural member and the coupling apparatus, thereby the coupling apparatus may be subjected to fatigue failure.

The present invention is derived from the above described circumstances, an object of the present invention is to provide a coupling apparatus for structural members which is simple in structure and can make assembling and disassembling work of the construction easy while the assembling and disassembling work is performed in the unstable environment, such as on the body floating on water, or in underwater, aerospace, or the like.

A further object of the present invention is to provide a coupling apparatus for structural members which is simple in structure, can make assembling and disassembling work of the construction easy even if the assembling and disassembling work is performed in the unstable environment such as on the body floating on water or in the underwater, aerospace, or the like, and even if the assembling and disassembling work is performed in the environment where the construction is exposed to high temperature and low temperature for a long time period, and further prevents the construction from generating a large amount of deformation and stress due to temperature expansion and temperature contraction.

BRIEF SUMMARY OF THE INVENTION

In order to achieve the above firstly described object of the present invention, a coupling apparatus for structural members according to one embodiment of the present invention comprises a pair of couplers which couples structural members independent of each other with each other, and each of the pair of couplers includes:

a cylindrical inner coupler main body rotationally mounted on the structural member at a predetermined position thereof, the structural member corresponding to the each coupler;

a cylindrical outer coupler main body rotationally fitted on the outer periphery of the inner coupler main body;

a plurality of engaging projections disposed on each of the inner coupler main body and the outer coupler main body at the projecting end thereof opposite to the corresponding structural member, and projecting in a direction along the center line of each coupler main body from a plurality of positions spaced apart from each other at predetermined intervals in the circumferential direction of each coupler main body;

an engaging hook projecting in one circumferential direction of the inner coupler main body from one side surface of the projecting end portion of each of the engaging projections of the inner coupler main body;

an engaging hook projecting in the other circumferential direction of the outer coupler main body from the other side surface of the projecting end portion of each of the engaging projections of the outer coupler main body; and an urging unit interposed between the inner coupler main body and the outer coupler main body and urging the inner coupler main body and the outer coupler main body in opposite circumferential directions, and when the plurality of engaging projections of the inner coupler main body and the plurality of engaging projections of the outer coupler main body of one coupler are inserted into a plurality of recesses between the plurality of engaging projections of the inner coupler main body and a plurality of recesses between the plurality of engaging projections of the outer coupler main body of the other coupler, the plurality of engaging hooks of the plurality of engaging projections of the inner coupler main body of the one coupler come into contact with the plurality of engaging hooks of the plurality of engaging projections of the inner coupler main body of the other coupler to rotate the inner coupler main body of the one coupler and the inner coupler main body of the other coupler with respect to each other in the predetermined opposite circumferential directions against the urging force of the urging unit, and thereafter the inner coupler main body of the one coupler and the inner coupler main body of the other coupler are rotated in the anti-predetermined opposite circumferential directions by the urging force of the urging unit, thereby the plurality of engaging hooks of the plurality of engaging projections of the inner coupler main body and the plurality of engaging hooks of the plurality of engaging projections of the outer coupler main body of the one coupler are engaged with the plurality of engaging hooks of the plurality of engaging projections of the inner coupler main body and the plurality of engaging hooks of the plurality of engaging projections of the outer coupler main body of the other coupler in a direction where the couplers are separated from each other along the center line of each of them.

In order to achieve the above firstly described object of the present invention, a coupling apparatus for structural members according to another embodiment of the present invention comprises a pair of couplers which couples structural members independent of each other with each other, and each of the pair of couplers includes:

an abutment member fixed to a predetermined position of the structural member corresponding to the each coupler, the abutment member having an abutment surface;

a cylindrical coupler main body disposed on the outer periphery of the abutment member and being rotational with respect to the predetermined position of the corresponding structural member;

a plurality of engaging projections disposed on the coupler main body at the projecting end thereof opposite to the corresponding structural member, and projecting in a direction along the center line of the coupler main body from a plurality of positions arranged at predetermined intervals in the circumferential direction of the coupler main body; and an engaging hook projecting in one circumferential direction of the coupler main body from one side surface of projecting end portion of each of the engaging projections, and having an engaging surface slanting toward the projecting direction of the each engaging projection with respect to an imaginary surface orthogonal to the center line of the coupler main body, and when the structural members corresponding to the pair of couplers are coupled with each other by the pair of couplers, the abutment surfaces of the abutment members of the structural members corresponding to the pair of couplers are abutted against each other.

In order to achieve the above secondary described object of the present invention, a coupling apparatus for structural members according to a further embodiment of the present invention comprises a pair of couplers which couples structural members independent of each other with each other, and each of the pair of couplers includes:

a cylindrical coupler main body;

a plurality of engaging projections disposed at the projecting end of the coupler main body and projecting along the center line of the cylindrical coupler main body from a plurality of positions spaced apart from each other at predetermined intervals in the circumferential direction of the cylindrical coupler main body; and an engaging hook projecting from the projecting end portion of each of the plurality of engaging projections in the predetermined one circumferential direction of the cylindrical coupler main body, and after the plurality of engaging projections of the coupler main body of the one coupler are inserted into a plurality of recesses between the plurality of engaging projections of the coupler main body of the other coupler, the coupler main body of the one coupler is rotated in the predetermined one circumferential direction with respect to the coupler main body of the other coupler, thereby the plurality of engaging hooks of the plurality of engaging projections of the one coupler are engaged with the plurality of engaging hooks of the plurality of engaging projections of the other coupler in a direction where the pair of couplers are separated from each other in a direction along the center line of each coupler main body, and at least one of the pair of couplers further includes a coupling direction changing mechanism which couples the at least one of the pair of couplers with the predetermined position of the corresponding structural member so that the center line of the coupler main body of the at least one of the pair of couplers can be orientated in a desired direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view schematically showing a coupling apparatus for structural members according to a first embodiment of the present invention in a state that a pair of couplers are separated from each other;

FIG. 11A is a schematic longitudinal sectional view of one of a pair of couplers of a coupling apparatus for structural members according to a third embodiment of the present invention;

FIG. 11B is a schematic front view of the one coupler shown in FIG. 11A;

FIG. 13A is a schematic longitudinal sectional view of one of a pair of couplers of a coupling apparatus for structural members according to a fourth embodiment of the present invention;

FIG. 13B is a schematic front view of the one coupler shown in FIG. 13A;

DETAILED DESCRIPTION OF THE INVENTION

Various embodiments and various modifications of a coupling apparatus for structural members of the present invention will be explained below in detail with reference to FIGS. 1 to 16 of the accompanying drawings.

First Embodiment

Figure 2:
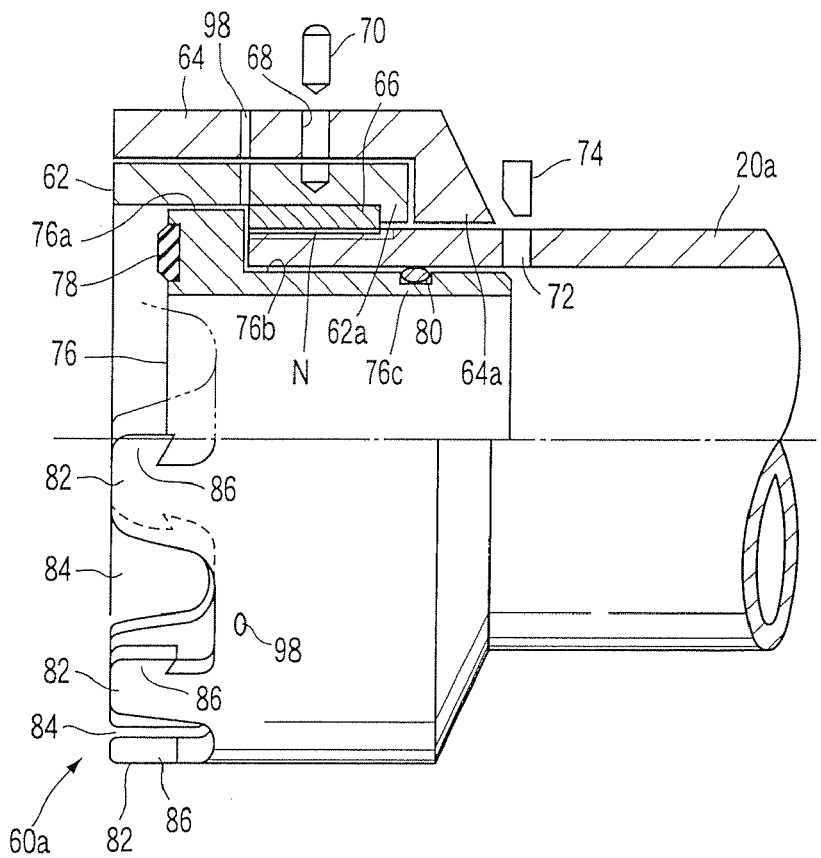
FIG. 2 is a side view schematically showing one of the pair of couplers shown in FIG. 1 with its upper half portion shown in a longitudinal section.
Figure 3:
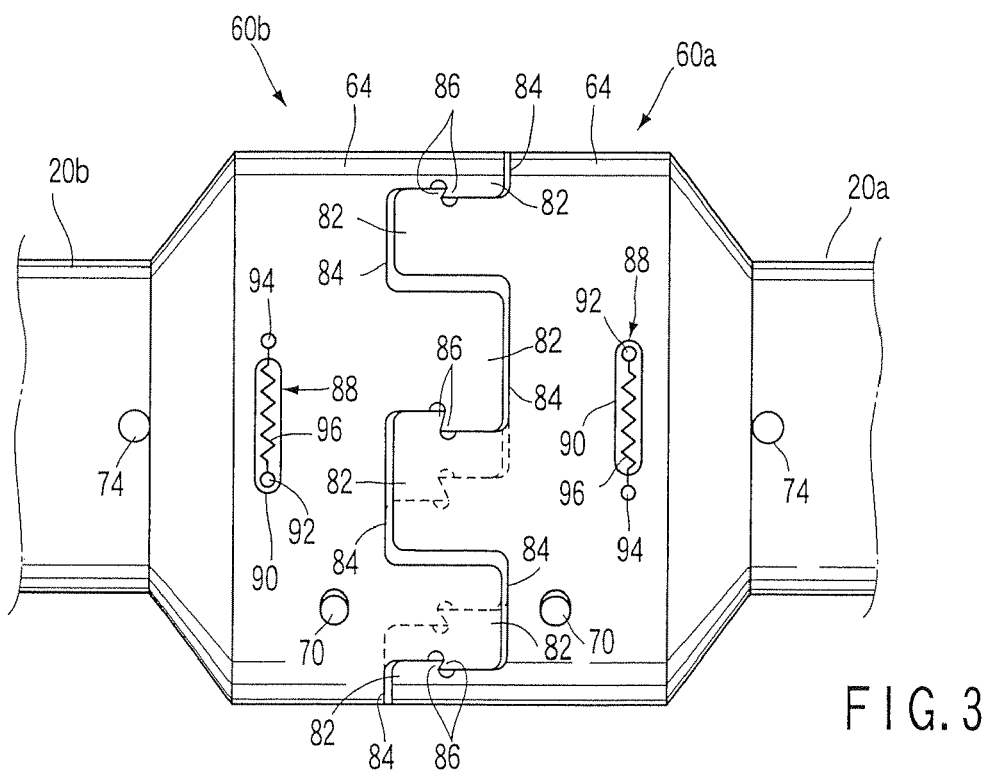
FIG. 3 is a schematic side view showing the pair of couplers shown in FIG. 1 in a state that they are coupled with each other.

At first, a coupling apparatus for structural members according to a first embodiment of the present invention will be explained in detail with reference to FIGS. 1 to 3.

The coupling apparatus includes a pair of couplers 60a, 60b having the same structure. Each of the pair of couplers 60a, 60b has a double structure including a cylindrical inner coupler main body 62 and a cylindrical outer coupler main body 64 located on the outer peripheral surface of the inner coupler main body 62.

The inner coupler main body 62 is rotatably fitted into one end portion of a truss structural member 20a acting as a structural member. The inner peripheral surface of the outer coupler main body 64 is rotatably fitted on the outer peripheral surface of the inner coupler main body 62.

More specifically, a male screw portion N is formed on the outer peripheral surface of the one end portion of the truss structural member 20a, and a female screw portion formed on the inner peripheral surface of a collar 66 is screwed on the male screw portion N. The outer peripheral surface of the collar 66 projects outwardly from outer peripheral surface of the truss structural member 20a in the radial direction of the truss structural member 20a, and the inner peripheral surface of the inner coupler main body 1042 is rotatably fitted on the outer peripheral surface of the collar 66.

An inner flange 60a is formed on the inner peripheral surface of the inner coupler main body 62 at the end thereof located on the truss structural member 20a. The inner flange 60a engages with the inner end of the collar 66 located on the truss structural member 20a in a direction along the center line of the inner coupler main body 62 and forms a drop-off preventing projection for preventing the drop-off of the inner coupler main body 62 from the collar 66. An inner flange 64a is formed on the outer coupler main body 64 at the end thereof located on the truss structural member 20a. The inner flange 64a of the outer coupler main body 64 engages with the end of the inner flange 60a of the inner coupler main body 62 located on the truss structural member 20a in the direction along the center line and forms a drop-off preventing projection for preventing the drop-off of the outer coupler main body 64 from the inner coupler main body 62.

Holes 68 are formed in the outer coupler main body 64 from the inner coupler main body 62 at their positions aligning with each other in a radial direction with respect to the center line when the pair of couplers 60a, 60b are coupled with each other. A fixing pin 70, which acts as a circumferential position fixing means for fixing a relative circumferential position of the outer coupler main body 64 to the inner coupler main body 62, can be inserted into the hole 68.

The inner coupler main body 62 and the outer coupler main body 64, which are fixed to each other by the fixing pin 70, are free to rotate together in a circumferential direction of the truss structural member 20a with respect to the one end portion of the truss structural member 20a.

A hole 72 is formed in the one end portion of the truss structural member 20a at a position thereof located near to the inner flange 64a of the outer coupler main body 64 when the pair of couplers 60a, 60b are coupled with each other.

A wedge 74 can be inserted into the hole 72, and the wedge 74 acts as an axial position fixing means for fixing the position of the outer coupler main body 64 with respect to the one end portion of the truss member 20a and to the inner coupler main body 62 in the direction along the center line.

The size of the wedge 74 is so set that the outer end portion of the wedge 74 projects from the outer peripheral surface of the truss structural member 20a after the wedge 74 is pushed into the hole 72.

The wedge 74 prevents the outer coupler main body 64 from moving in the direction along the center line with respect to the one end portion of the truss structural member 20a and to the inner coupler main body 62 while the pair of couplers 60a, 60b are not coupled with each other.

A centering cylindrical member 76 acting as a position alignment member is inserted into the inner hole of the inner coupler main body 62. The outer peripheral surface of the centering cylindrical member 76 is formed in a stepped shape. A large diameter portion 76a of the centering cylindrical member 76 is movably fitted on the inner peripheral surface of the inner coupler main body 62, and a small diameter portion 76b thereof is movably fitted on the inner peripheral surface of the one end portion of the truss structural member 20a.

The end face of the centering cylindrical member 76, which is far from the truss structural member 20a, is located nearer to the truss structural member 20a than the end face of the inner coupler main body 62, which is far from the truss structural member 20a. An annular packing 78 is attached to the end face of the centering cylindrical member 76 and projects therefrom in the direction along the center line.

When the pair of coupler main bodies 60a, 60b are coupled with each other, the pair of the centering cylindrical members 76 abut the packing members 78 against each other and arrange the center lines of the inner coupler main body 62 and the outer coupler main body 64 of one of the pair of couplers 60a, 60b to align with the center lines of the inner coupler main body 62 and the outer coupler main body 64 of the other in the radial directions thereof.

The size of the centering cylindrical member 76 is so set that it is free to move with respect to the inner coupler main body 62 and the truss structural member 20a. Accordingly, even if the truss structural member 20a is inclined only slightly with respect to the horizontal line before the pair of couplers 60a, 60b are coupled with each other, the centering cylindrical member 76 is easily dropped off from the inner coupler main body 62 and the truss structural member 20a.

To prevent this easy dropping-off, an O-ring 80 is fitted in an annular groove 76c formed in the outer peripheral surface of the small diameter portion 76b of the centering cylindrical member 76. The friction force generated between the inner peripheral surface of the one end portion of the truss structural member 20a and the O-ring 80 on the outer peripheral surface of the small diameter portion 76b of the centering cylindrical member 76 prevents the easy dropping-off.

A plurality of engaging projections 82 are disposed on the projecting end of each of the inner coupler main body 62 and the outer coupler main body 64 so as to project in the direction along the center line from a plurality of positions spaced apart at predetermined intervals from each other in the circumferential direction of each of the inner coupler main body 62 and the outer coupler main body 64, and engaging recesses 84 are formed between these engaging projections 82.

When the pair of couplers 60a, 60b are coupled with each other, the plurality of engaging projections 82 of the inner coupler main body 62 of the one coupler 60a are inserted into the plurality of engaging recesses 84 of the inner coupler main body 62 of the other coupler 60b. Further, at the same time, the plurality of engaging projections 82 of the inner coupler main body 62 of the other coupler 60b are inserted into the plurality of engaging recesses 84 of the inner coupler main body 62 of the one coupler 60a.

Also, the plurality of engaging projections 82 of the outer coupler main body 64 of the one coupler 60a are inserted into the plurality of engaging recesses 84 of the outer coupler main body 64 of the other coupler 60b. Further, at the same time, the plurality of engaging projections 82 of the outer coupler main body 64 of the other coupler 60b are inserted into the plurality of engaging recesses 84 of the outer coupler main body 64 of the one coupler 60a.

The size of each engaging recess 84 in the circumferential direction is so set that it is somewhat larger than that of each engaging projection 82. Accordingly, the inner and outer coupler main bodies 62, 64 of one of the pair of couplers 60a, 60b are free to rotate within a predetermined range in the circumferential direction with respect to the inner and outer coupler main bodies 62, 64 of the other while the engaging projections 82 are inserted into the engaging recesses 84 as described above.

An engaging hook 86 is formed on one side surface of the projecting end portion of each engaging projection 82, the one side surface facing in one circumferential direction, and the engaging hook 86 projects in the one circumferential direction. In each of the pair of couplers 60a, 60b, the engaging hooks 86 of the inner coupler main body 62 project from the one side surfaces of the projecting end portions of the engaging projections 82 in the one circumferential direction, and the engaging hooks 86 of the outer coupler main body 64 project from the other side surfaces of the projecting end portions of the engaging projections 82 in the other circumferential direction.

As shown in FIG. 1, in a state that the pair of couplers 60a, 60b are arranged to face each other in their axial directions, the engaging hooks 86 on the engaging projections 82 of the inner coupler main body 62 of one coupler and those of the other coupler oppositely project in the circumferential direction, and also the engaging hooks 86 on the engaging projections 82 of the outer coupler main body 64 of one coupler and those of the other coupler oppositely project in the circumferential direction.

Accordingly, when one of the pair of couplers 60a, 60b is moved in the above state and the engaging projections 82 of each coupler 60a or 60b are inserted into the engaging recesses 84 of each facing one, the engaging hooks 86 of the one coupler and those of the other coupler, which are oppositely projected in the circumferential direction, can be engageable in a direction along the center lines thereof.

The engaging surface of each engaging hook 86 is inclined with a predetermined angle with respect to the circumferential direction in an overhung state. Accordingly, when a load is exerted on the pair of couplers 60a, 60b in a direction where they are separated from each other in a state that the engaging hooks 86 thereof are engaged with each other, the engaging hooks 86 are more strongly engaged with each other, thereby separation of the inner coupler main bodies 62 from each other and separation of the outer coupler main bodies 64 from each other can be more securely prevented.

In a state that the engaging hooks 86 are engaged with each other, gaps exist between the projecting end faces of the engaging projections 82 and the bottom surfaces of the engaging recesses 84. Accordingly, the engaging projections 82 can be moved in the engaging recesses 84 more deeply in the direction along the center line.

An urging unit 88 is disposed and exposed on the outer peripheral surface of the outer coupler main body 64. The urging unit 88 includes a slot 90, a stopper pin 92, a receiver pin 94, and a tension spring 96. The slot 90 is formed in the outer coupler main body 64 to extend in the circumferential direction, the stopper pin 92 is inserted in the slot 90 and planted in the outer peripheral surface of the inner coupler main body 62, the receiver pin 94 is disposed at a position near to an end of the slot 90 on the outer peripheral surface of the outer coupler main body 64, and the tension spring 96 is stretched between the receiver pin 94 and the stopper pin 92.

That is, the urging unit 88 is interposed between the inner coupler main body 62 and the outer coupler main body 64 and elastically urges the inner coupler main body 62 and the outer coupler main body 64 by the tension force so that they are rotated in opposite circumferential directions with respect to each other.

In each of the pair of couplers 60a, 60b, the stopper pin 92 and the receiver pin 94, which constitute the urging unit 88, are disposed at opposite positions with respect to the slot 90 in the circumferential directions, as well as the engaging hooks 86 disposed on the inner coupler main body 62 and those disposed on the outer coupler main body 64 are projected in the opposite circumferential directions with respect to each other.

In any way, the urging unit 88 of each of the pair of couplers 60a, 60b urges the inner coupler main body 62 and the outer coupler main body 64 to move the engaging hooks 86 of the inner coupler main body 62 and those of the outer coupler main body 64 close to each other.

To couple the coupler 60a, 60b with each other, the engaging projections 82 of the inner and outer coupler main bodies 62, 64 of the one coupler 60a are aligned with the engaging recesses 84 of the inner and outer coupler main bodies 62, 64 of the other coupler 60b.

The engaging recesses 84 of the inner and outer coupler main bodies 62, 64 of the one coupler 60a are inevitably aligned with the engaging projections 82 of the inner and outer coupler main bodies 62, 64 of the other coupler 60b.

Then, the one coupler 60a is moved in the direction along the center line to approach the other coupler 60b while maintaining their attitudes as they are. After all of the engaging projections 82 of the couplers 60a, 60b are inserted into all of the engaging recesses 84 thereof, the engaging hooks 86 of one coupler 60a and those of the other coupler 60b are engaged with each other by the elastically urging action of the urging units 88.

When the couplers 60a, 60b are coupled with each other by this one-touch operation, the structural members 20a, 20b are coupled with each other. Then, the circumferential position fixing pin 70 is inserted into the holes 68 of the inner and outer coupler main bodies 62, 64 of each of the couplers 60a, 60b to fix the inner and outer coupler main bodies 62, 64 to each other, and finally the wedge 74 is inserted into the hole 72 to press the centering cylindrical member 76 as the aligning member in a direction where it projects from the truss structural member 20a. As a result, the pair of couplers 60a, 60b can be more strongly coupled with each other.

The use of the wedge 74 brings the more strong coupling of the couplers 60a, 60b, but the compression load exerted on the truss structural members 20a, 20b including the overall coupling apparatus is transmitted to the centering cylindrical members 76 through the wedge 74 and is directly transmitted to the truss structural members 20a, 20b through the wedge 74. Accordingly, when the compression load is extremely large, the existence of the wedge 74 is liable to be disadvantageous.

Further, since a construction is formed by combining many truss structural members, if each truss structural member has an error in size, a large error in size occurs when the many structural members are coupled with each other and the construction is formed. As a result, the coupling apparatus must be finished as it is designed, and occurrence of rattle is not preferable.

Accordingly, the shape of the wedge 74 is so set that the use of the wedge 74 brings an entirely and flatly crush of the packings 78 at the projecting ends of the centering cylindrical members 76 of the pair of couplers, a direct contact of the centering cylindrical members 76 made of metal material with each other, and a pushing of the inner and outer coupler main bodies 62, 64 by which the inner and outer coupler main bodies 62, 64 are moved for eliminating the rattle of the inner and outer coupler main bodies 62, 64.

The use of wedge 74 as described above causes the inner and outer coupler main bodies 62, 64 of one coupler to couple with the inner and outer coupler main bodies 62, 64 of the other coupler (namely, the pair of couplers 60a, 60b to be coupled with each other) without producing the rattle in the direction along the center lines between them. As a result, desired dimensional accuracy can be produced when the truss structural members 20a, 20b are coupled with each other.

Further, in order to effectively and uniformly transmit the compression load exerted on the truss structural members 20a, 20b to them without only through the wedge 74 and to obtain the strong coupling of the truss structural members 20a, 20b, an appropriate adhesive for structural members (for example, Araldite made by Vantico (former name, Ciba-Geigy)) may be filled into and solidified in a space formed between the centering cylindrical member 76 and the projecting end face of the truss structural member 20a when the wedge 74 is inserted into the hole 72.

In order to fill the adhesive into the space as described above, adhesive filling holes 20 are formed in the inner and outer coupler main bodies 62, 64 to pass through the inner and outer peripheral surfaces of each of them at their positions which are aligned and communicated with each other in a state that the couplers 60a, 60b are coupled with each other.

Further, the fixing pin 70 may be a columnar shape or a tapered shape. Since the fixing pin 70 inserted into each of the couplers 60a, 60b fixes the relative movement of the outer coupler main body 64 with respect to the inner coupler main body 62 in each of the couplers 60a, 60b, the fixing pins 70 act as engaging mechanisms for preventing the couplers coupled with each other from separating from each other when the fixing pins 70 are inserted into both the couplers 60a, 60b coupled with each other.

Further, the fixing pin 70 may be formed in a tapered shape reducing its diameter to a point thereof. At the same time, the diameter of the hole 68 of the inner coupler main body 62 may be formed smaller than that of the hole 68 of the outer coupler main body 64. In this case, even if the inner and outer coupler main bodies 62, 64 are displaced somewhat from their predetermined relative positions in the coupling state of the couplers, the inner and outer coupler main bodies 62, 64 are displaced to their predetermined relative positions when the fixing pins 70 are inserted into the holes 68.

In the couplers 60a, 60b, the packings 78 of the centering cylindrical members 76 are abutted against each other and to seal between them, and each of the centering cylindrical members 76 centers the center lines of the inner and outer coupler main bodies 62, 64 thereon with each other. That is, the center lines of the couplers 60a, 60b to be coupled with each other are centered with each other, and the center lines of the truss structural members 20a, 20b are centered with each other.

In the coupling apparatus for coupling the pipe shaped truss structural members 20a, 20b as described above, the couplers 60a, 60b have no male and female types so that they can be easily manufactured and can be freely attached to any of the truss structural members 20a, 20b.

Further, the stroke of each of the couplers 60a, 60b in the direction along the center line thereof needed for coupling and separation of the truss structural members 20a, 20b with and from each other is short so that the coupling and separation of the truss structural members 20a, 20b with and from each other can be performed in one-touch operations, and the operations for the coupling and separation of the truss structural members 20a, 20b with and from each other can be performed more speedily and effectively.

Since the couplers 60a, 60b, each of which is the double structure of the inner coupler main body 62 and the outer coupler main body 64, are coupled with each other, strength of the couplers 60a, 60b coupled with each other is increased in a state that the couplers 60a, 60b are coupled with each other to promote the safety and reliability of the coupled couplers 60a, 60b.

Since, in each of the couplers 60a, 60b, the engaging hooks 86 of the inner coupler main body 62 and the engaging hooks 86 of the outer coupler main body 64 project in opposite directions and the urging mechanism 88 elastically urges the engaging hooks 86 in a direction where they are engaged with each other, the couplers 60a, 60b are more strongly coupled with each other and are not affected by a shock and the like applied them at all.

Even if torque is exerted on the couplers 60a, 60b coupled with each other in any of the circumferential directions, or bending moment, tension force, or compression force is exerted thereon, the coupling of the inner coupler main bodies 62 and that of the outer coupler main bodies 64 in the couplers 60a, 60b are not released due to the above described configurations of the couplers 60a, 60b.

In a state that the couplers 60a, 60b are coupled with each other, the packing members 78 disposed at the projecting end faces of the tubular centering cylindrical members 76 and being in intimate contact with each other and the O-rings 80 fitted on the small diameter portions of the tubular centering cylindrical members 76 seal the inner holes of the couplers 60a, 60b. As a result, it is possible to flow fluid in the truss structural members 20a, 20b as pipes.

When the couplers 60a, 60b are disassembled (separated) from each other, the fixing pins 70 and the wedges 74 are removed, and the urging mechanism 88 provided on any one of the couplers 60a, 60b is operated.

That is, for that operation, the outer coupler main body 64 is held by one hand of an operator to prevent its rotation, and the stopper pin 92 of the urging mechanism 88 is moved by the other hand in a direction opposite to the urging direction of the tension spring 96 so that the tension spring 96 is expanded.

By the above described operation, the inner coupler main bodies 62 are rotated against the urging forces of the urging mechanisms 88 so that the engaging hooks 86 are moved to release their mutual engagement. When the one side surfaces of the engaging projections of the inner coupler main bodies 62 of the couplers 60a, 60b, the side surfaces being not provided with the engaging hooks 86, come into contact with each other, the engaging hooks 86 of the couplers 60a, 60b are completely separated from each other.

The mutual coupling of the inner coupler main bodies 62 and that of the outer coupler main bodies 64 in the couplers 60a, 60b are released at the same time, and the couplers 60a, 60b are free from each other and can be separated from each other.

As described above, there is no need to apply large torque on the couplers 60a, 60b and to screw bolt into and off from the couplers 60a, 60b when the couplers 60a, 60b are coupled with or separated from each other, and the coupling and separation of the couplers 60a, 60b with and from each other can be performed by an easy operation like the one-touch operation. This makes the construction work in an unstable condition such as in the aerospace and in the underwater easy, and greatly improves workability in the construction work.

The couplers 60a, 60b may be used not only for building the construction by coupling the truss structural members 20a, 20b with each other as described above, but also for coupling the truss structural members formed as pipes and accommodating harnesses and connectors. Further, they may be used for making an artificial limb such as an artificial hand and an artificial leg and enjoys the same technical advantages as that enjoyed in the above described embodiment.

In a case that there is no need to separate the couplers 60a, 60b from each other after they have been coupled with each other, the gaps between the engaging projections 82 and engaging recesses 84 of one of the outer coupler main bodies 64 and those of the other may be filled by welding or by a strong resin such as an adhesive (epoxy adhesive, for example Araldite made by Vantico (former name, Ciba-Geigy)), and the like. With this filler, the coupler member can be made more robust and can withstand a semipermanent use.

Second Embodiment

A coupling apparatus of this embodiment includes a pair of couplers 100a, 100b having the same structure without male and female types. The one coupler 100a is connected to a node pipe as a structural member connected to a node 2, and the other coupler 100b is connected to a truss structural member 20a. The truss structural member 20a is connected to the node 2 by coupling the couplers 100a, 100b.

Since the couplers 100a, 100b have the same structure as to each other, the structure of one coupler 100b will be explained in the following. The coupler 100b has a double structure composed of a stopper nut 102 as an abutment member and a coupler main body 104 arranged on the outer peripheral surface of the stopper nut 102.

The stopper nut 102 is formed of a cylindrical member and is screwed on and fixed to an end portion of the truss structural member 20a. The coupler main body 104 is composed of a cylindrical member, and the inner peripheral surface thereof is rotatably fitted on the outer peripheral surface of the stopper nut 102. That is, a nut engaging portion 104a is provided on the inner peripheral surface of the coupler main body 104, and the rear end face of the stopper nut 102 is abutted against the nut engaging portion 104a. The dimensional error of the projecting end portion of the truss structural member 20a, which affects the coupling accuracy of the couplers when they are coupled with each other, can be absorbed by attaching the stopper nut 102. However, since they can be formed with high accuracy in a factory, the coupler main body 104 can be attached to the truss structural member 20a (node side pipe) with high accuracy. Further, the entire length of the truss structural member 20a can be finely adjusted by adjusting a screwing amount of the stopper nut 102 on the projecting end portion of the truss structural member 20a. In this case, it is preferable to fix the stopper nut 102 on the projecting end portion of the truss structural member 20a with an adhesive after the fine adjustment.

To explain in more detail, a male screw portion 102a is formed on the outer peripheral surface of the projecting end portion of the truss structural member 20a, and a female screw portion 102b, which is screwed on the male screw portion 102a, is formed on the inner peripheral surface of the stopper nut 102. An abutment surface portion 102b is formed at the projecting end of the stopper nut 102 and inwardly projects in a diameter direction, and the inner side face of the abutment surface portion 102b is intimately engaged with the projecting end face of the truss structural member 20a. Further, a grooved portion 102c is formed at the root of the inner side face of the abutment surface portion 102b, and a portion of the abutment surface portion 102b, which is thinned by the grooved portion 102c, forms an elastically deformable portion. In a case that the female screw portion 102b is excessively screwed on the male screw portion 102a when the stopper nut 102 is fixed on the truss structural member 20a, the abutment surface portion 102b of the stopper nut 102 is elastically deformed in the axial direction at the grooved portion 102c and applies force to the stopper nut 102 in a direction where the backlash between the female screw portion 102b and the male screw portion 102a is disappeared so that the stopper nut 102 is prevented from being loosened.

Figure 8A:
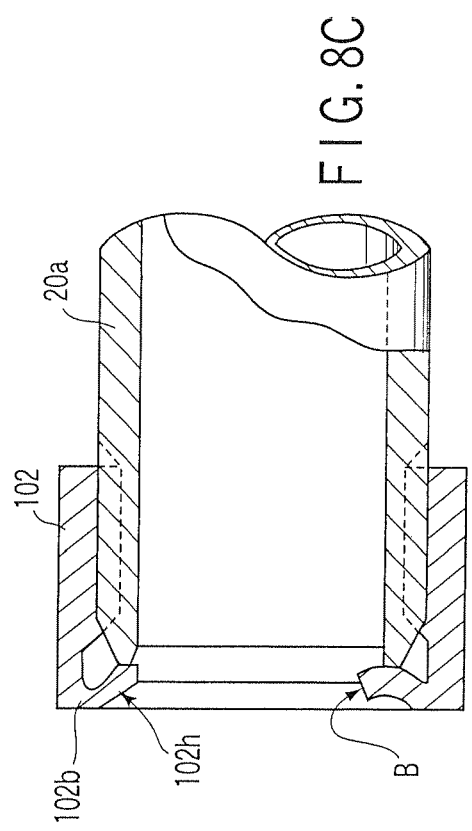
FIG. 8A is a schematic longitudinal sectional view showing a state in which an abutment surface of an abutment member of one of the pair of couplers shown in FIG. 4 is damaged.
Figure 8C:
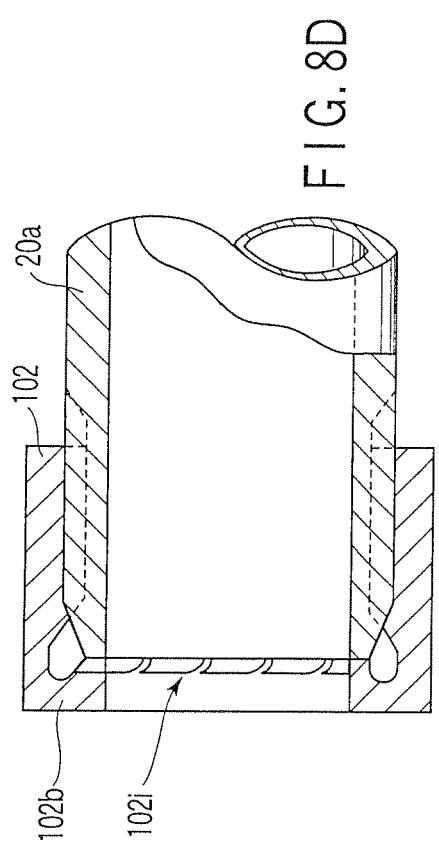
FIG. 8C is a schematic longitudinal sectional view of a second modification of the abutment member of each of the pair of couplers shown in FIG. 4 in which the function of an abutment surface does not fail even if it is damaged as shown in FIG. 8A.
Figure 8B:
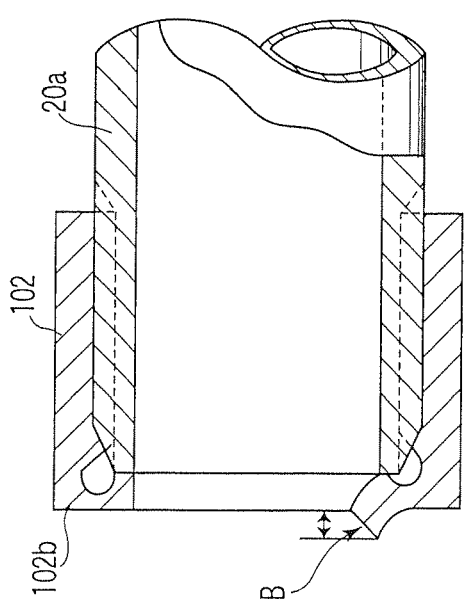
FIG. 8B is a schematic longitudinal sectional view of a first modification of the abutment member of each of the pair of couplers shown in FIG. 4 in which the function of the abutment surface does not fail even if it is damaged as shown in FIG. 8A.
Figure 8D:
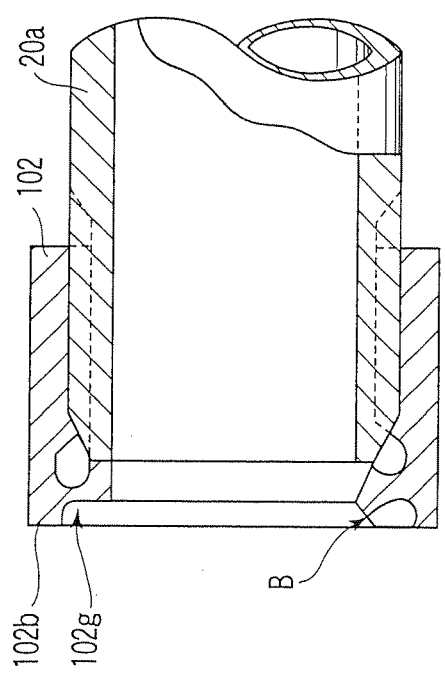
FIG. 8D is a schematic longitudinal sectional view of a third modification of the abutment member of each of the pair of couplers shown in FIG. 4 in which the function of an abutment surface does not fail even if it is damaged as shown in FIG. 8A.

When the above described effect, by which the loosening of the stopper nut 102 is prevented, is obtained by the elastic deformation of the stopper nut 102 in the vicinity of the grooved portion 102c formed in the stopper nut 102, there is a possibility that the flatness of the abutment surface portion 102b of the stopper nut 102 is deteriorated and a part of the abutment surface portion 102b is largely projected as indicated by "B" in FIG. 8(a) by the excess elastic deformation of the stopper nut 102 owing to the material of the stopper nut 102. In this case, the coupling function of the couplers may be deteriorated. To prevent this deterioration, an axially inwardly stepped portion 102g may be formed in the abutment surface portion 102b of the stopper nut 102 as shown in FIG. 8(b) or an axially inwardly slanted portion 102h may be formed in the abutment surface portion 102b of the stopper nut 102 as shown in FIG. 8(c). With this configuration, even if abutment surface portion 102b is excessively and elastically deformed at the grooved portion 102c within a certain range, the excessively and elastically deformed portion does not largely and outwardly project in the axial direction. Further, by machining the surface of the stopper nut 102, which is abutted against the end face of the truss structural member 20a, to make it function as a spring washer 102i, as shown in FIG. 8D, the effect for preventing the loosening of the stopper nut 102 can be obtained without deforming the abutment surface portion 102b.

A plurality of engaging projections 106 are provided on the projecting end of the coupler main body 104 to project in the axial direction at positions spaced apart from each other at predetermined intervals in the circumferential direction, and engaging recesses 108 are formed between the engaging projections 106. The engaging projections 106 of the coupler main body 104 of one coupler 100a are fitted into the engaging recesses 108 of the coupler main body 104 of the other coupler 100b, and the engaging projections 106 of the coupler main body 104 of the other coupler 100b are fitted into the engaging recesses 108 of the coupler main body 104 of the one coupler 100a, so that the pair of the couplers 100a, 100b are coupled with each other in a complementary manner.

Note that the width of each of the engaging recesses 108 is set larger than that of each of the engaging projections 106 so that a coupler main body 104 is rotational by the predetermined distance in the circumferential direction in a state that the engaging projections 106 are fitted into the engaging recesses 108.

Further, the engaging hook 110, which projects in the circumferential direction, is formed on one side surface of each of the engaging projections 106 of the coupler main bodies 104. After the pair of couplers 100a, 100b are faced with each other in their axial directions, any one of the coupler main bodies 104 is moved to fit the engaging projections 106 into the engaging recesses 108, so that the engaging hooks 110 of the one coupler and those of the other can be engaged with each other.

The engaging surface 110a of the engaging hook 110 slants in a direction approaching to the projecting end of the engaging projection 106 (plus direction) by a predetermined angle with respect to a plane orthogonal to the axial direction of the coupler main body 104. In the case that the engaging surface 110a of the engaging hook 110 is conventionally slanted in a minus direction, rotation force is exerted on the couplers 100a, 100b in a direction where the coupling of the couplers with each other becomes strengthened when tension load is applied on the couplers 100a, 100b. However, in the case that the engaging surface 110a of the engaging hook 110 is slanted in the plus direction as described above, rotation force is exerted on the couplers 100a, 100b in a direction where the coupling of the couplers with each other becomes weakened when tension load is applied on the couplers 100a, 100b. To prevent this phenomenon, an engaging angle θ of the engaging surface 110a is set to 1° to 2° in consideration of a frictional angle. When the engaging angle θ of the engaging surface 110a is set to, for example, 2°, the length of the engaging surface 110a projected in the axial direction of the truss structural member 20a is 0.1 mm to 0.3 mm in the axial direction of the coupler main body 104.

The position of the one coupler main body 104 with respect to the other coupler main body 104 is exclusively determined by the difference between the size L of the stopper nut 102 and the size L' between the nut engaging portion 104a and the center of the engaging surface 110a (S denotes the line passing through the centers of the engaging surfaces 110a). However, since the stopper nut 102 and the coupler main body 104 are machined with high accuracy in a factory so that the position of the abutment surface 102b of the stopper nut 102 and that of the center of the engaging surface 110a of each engaging hook 110 in the axial direction coincide with each other, a "play" between the pair of coupler main bodies 104 can be eliminated.

To couple the couplers 100a, 100b with each other, at first the engaging projections 106 of the coupler main body 104 of the one coupler 100a are faced to the engaging recesses 108 of the coupler main body 104 of the other coupler 100b, and the engaging recesses 108 of the coupler main body 104 of the one coupler 100a are inevitably faced to the engaging projections 106 of the coupler main body 104 of the other coupler 100b.

Then, at least one of the coupler main bodies 104 is moved in the axial direction while maintaining the above described circumferential positional relationship between the couplers 100a, 100b, so that all of the engaging projections 106 of the coupler main bodies 104 are fitted into the engaging recesses 108 thereof. Further, the coupler main bodies 104 are rotated in this state, and the engaging surfaces 110a of the engaging hooks 110 are slightly moved in the circumferential direction while they are sliding on each other. As a result, the coupler main bodies 104 are coupled with each other, thereby the node pipe is coupled with the truss structural member 20a.

At this time, the abutment surfaces 102b of the stopper nuts 102 arranged in the inside of the coupler main bodies 104 are abutted against each other. Therefore, when a compression load is exerted on the node pipe and the truss structural member 20a, the compression load is supported by the abutment surfaces 102b of the stopper nuts 102, and when a tension load is exerted on the node pipe and the truss structural member 20a, the tension load is supported by the engagement of the stopper nuts 102 with the nut engaging portions 104a.

Accordingly, even if any of the compression load and the tension load is exerted on the pair of couplers 100a, 100b coupled with each other, play will not produced between the pair of couplers 100a, 100b so that the node pipe and the truss structural member 20a are coupled with each other as in a condition in which they are directly coupled with each other.

Figure 4:
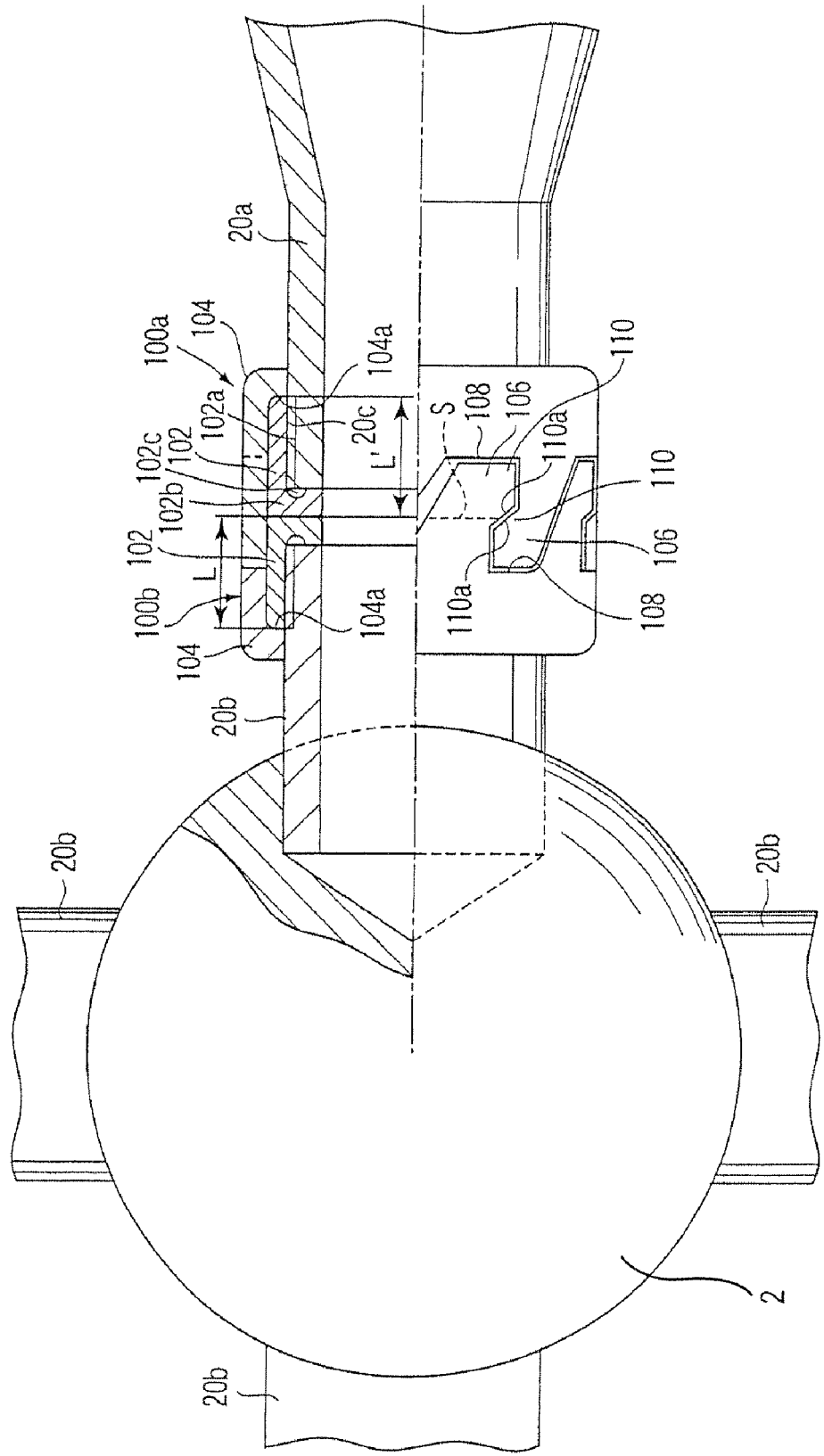
FIG. 4 is a schematic side view showing a coupling apparatus for structural members according to a second embodiment of the present invention in a state that a pair of couplers are coupled with each other with their upper half portions shown in a longitudinal section.
Figure 5:
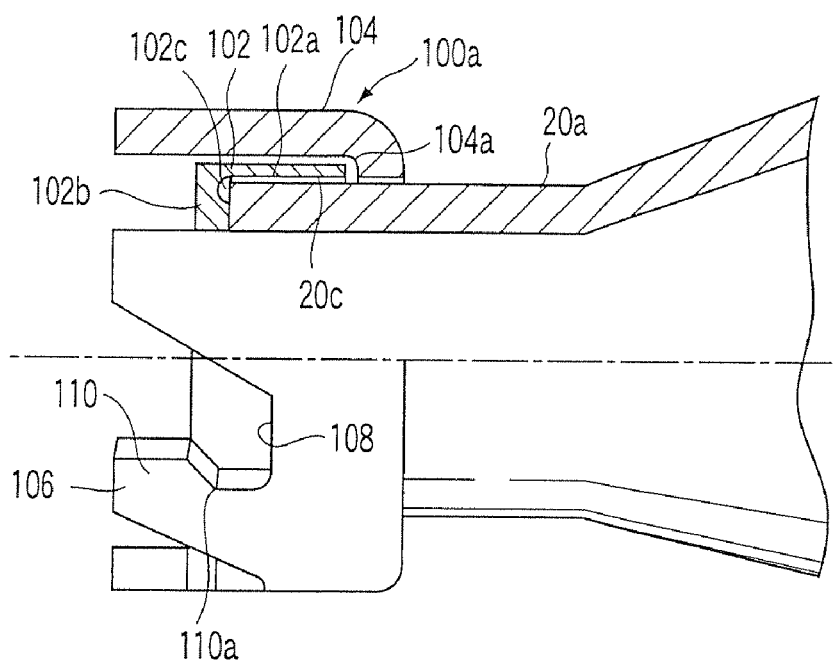
FIG. 5 is a schematic side view showing one of the pair of couplers shown in FIG. 4 with its upper half portion shown in a longitudinal section.
Figure 6:
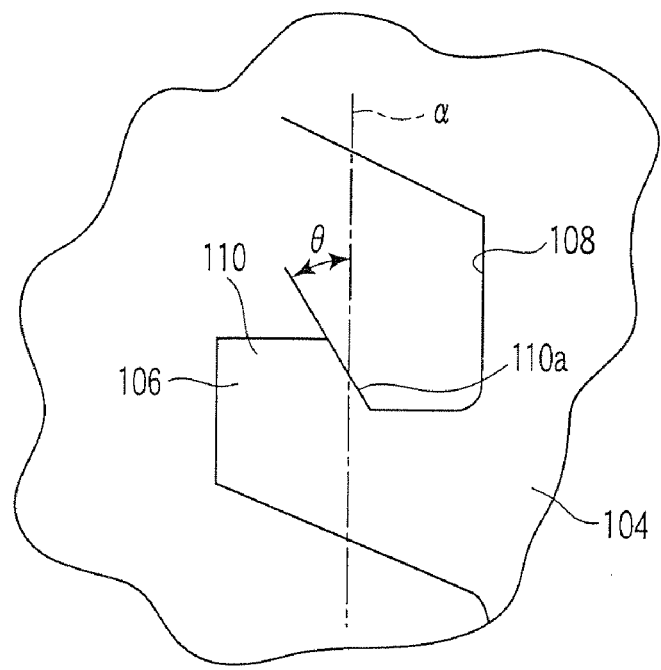
FIG. 6 is an enlarge view of one engaging hook of one of a plurality of engaging projections of a coupler main body of one coupler shown in FIG. 5.
Figure 7:
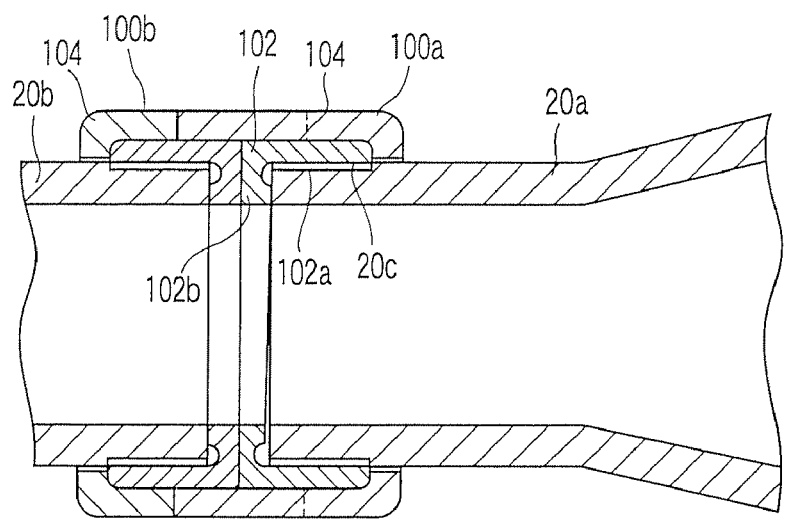
FIG. 7 is a schematic longitudinal sectional view for explaining a function of a pair of abutment members of the pair of couplers shown in FIG. 4 in a state that the pair of couplers are coupled with each other.

Further, even if the end face of the truss structural member 20a is obliquely cut, the stopper nut 102 can be coaxially fixed to the truss structural member 20a without being affected by the shape of the end face of the truss structural member 20a when the stopper nut 102 is screwed on the male screw portion 102a as shown in FIG. 4, and at the same time the abutment surface of the abutment surface portion 102b of the stopper nut 102 is arranged to be orthogonal to the center line of the truss structural member 20a. Therefore, since the abutment surfaces of the abutment surface portions 102b of the stopper nuts 102 are abutted against each other, the compression load exerted on the node pipe and the truss structural member 20a can be supported the couplers 100a, 100b.

Figure 9:
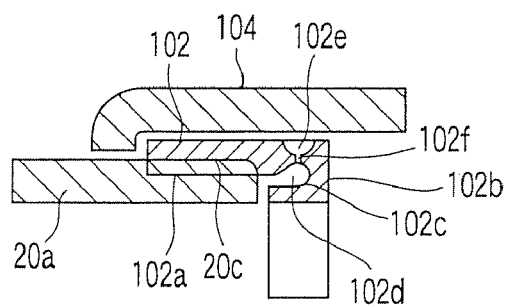
FIG. 9 is a schematic longitudinal sectional view showing a fourth modification of the abutment member of each of the pair of couplers shown in FIG. 4.

FIG. 9 shows a modification of the second embodiment. The same components of the modification as those of the first embodiment are denoted by the same reference numerals, and the explanation about them is omitted. The abutment surface portion 102b as the abutment member is formed on the projecting end portion of the stopper nut 102, and the abutment surface portion 102b inwardly projects in the diameter direction. The inner side surface of the abutment surface portion 102b is intimately engaged with the truss structural member 20a. Further, the grooved portion 102c is formed in the root of the inner side surface of the abutment surface portion 102b. The grooved portion 102c makes the thickness of the root of the abutment surface portion 102b being thinner to form the root as the elastically deformable portion and to produce a large cavity portion 102d.

A recessed portion 102e is formed in a portion of the outer peripheral surface of the stopper nut 102, and a through hole 102f, which communicates with the cavity portion 102d, is formed in the bottom of the recessed portion 102e. When an adhesive is charged into the through hole 102f after the female screw portion 102b of the stopper nut 102 is screwed on and fixed to the male screw portion 102a of the truss structural member 20a, the cavity portion 102d is filled with the adhesive, thereby the stopper nut 102 can be prevented from being loosened.

Further, the length of the truss structural member on both end portions of which couplers are attached is determined by the length from the abutment surface of the abutment surface portion 102b of the stopper nut 102 mounted on one end portion of the truss structural member 20a to the abutment surface of the abutment surface portion 102b of the stopper nut 102 mounted on the other end portion of the truss structural member 20a. Therefore, even if the truss structural member 20a is cut off to a length shorter than a predetermined length, it is possible to set the length between the abutment surfaces of the abutment surface portions 102b of the stopper nuts 102 mounted on the both end portions of the truss structural member 20a to the predetermined length by adjusting a degree of screwing the stopper nut 102 on each end portion of the truss structural member 20a, and by charging the adhesive into the cavity portion 102d through the through hole 102f or by fixing the female screw portion of the stopper nut 102 to the male screw portion of each end portion of the truss structural member 20a.

The truss structural member 20a is made of a steel pipe or a CRP pipe having no coupler and the like on both ends thereof, and the length of the truss structural member 20a having the couplers on both ends thereof is determined by the length between the abutment surfaces of the couplers.

Figure 10:
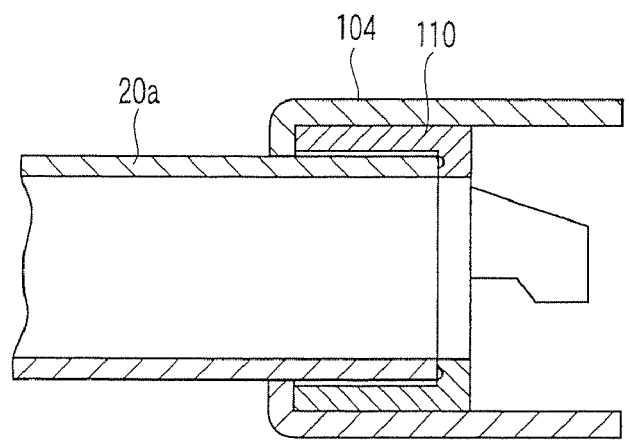
FIG. 10 is a schematic longitudinal sectional view of a fourth modification of the abutment member of each of the pair of couplers shown in FIG. 4.

FIG. 10 shows another modification of the second embodiment, and the same components as those of the first embodiment are denoted by the same reference numerals, and the explanation thereof is omitted. This modification is used for a coupling apparatus in which a relatively small load is exerted on couplers 100a, 100b. In this modification, a stopper ring 110 as an abutment member is fixed by adhesive or by welding to the truss structural member 20a, thereby the manufacturing process and assembling process for the truss structural member 20a with the couplers can be improved and the costs needed for these processes can be reduced.

With this modification, there is no need to apply torque on the couplers 100a, 100b and to screw one of them into and off from the other in order to couple and to release the coupling of the pair of the couplers 100a, 100b, and the couplers 100a, 100b can be coupled with each other and separated from each other by the one touch operation thereof. Therefore, a construction even in the unstable condition such as the aerospace or the underwater can be easily performed, and the workability of the construction can be largely improved.

Further, since the stopper nut 102 and the coupler main body 104 can be accurately disposed on each of the end portions of the truss structural member 20a without being affected by a finished state of the end faces of the end portions of truss structural member 20a, it is possible to cut a pipe stock (for example, a steel pipe stock) into the truss structural member 20a in a construction site and to fix the couplers each composed of the stopper nut 102 and the coupler main body 104 on both end portions of the truss structural member 20a in the construction site with high accuracy.

Otherwise, when the truss structural member 20a is made of the pipe, the truss structural member 20a can accommodates harnesses and connectors. Further, the truss structural member 20a with the couplers 100a, 100b can be used to form an artificial limb such as an artificial hand and an artificial leg, and also enjoys the above described various advantages. Therefore, the truss structural member 20a with the couplers 100a, 100b can be used in a wide variety of technical fields.

In the case that there is no need to release the coupling of the couplers 100a, 100b with each other after they have been coupled with each other, the gaps between the engaging projections 106 and the engaging recesses 108 of the coupler main bodies 104 may be filled by welding or with a strong plastic such as an adhesive (an epoxy adhesive, for example Araldite made by Vantico (former name, Ciba-Geigy)) and the like and solidified. With this filling, the strength of the couplers coupled with each other can be improved and the couplers coupled with each other can be used semipermanently.

Third Embodiment

At first, a coupling apparatus for structural members according to a third embodiment will be described in detail with reference to FIGS. 11A and 11B, and 12.

The coupling apparatus for structural members according to the third embodiment of the present invention includes a pair of couplers 22a, 22b that are mounted on the structural members 20a, 20b independent of each other and can be detachably coupled with each other to couple the structural members 20a, 20b with each other. In this embodiment, since the pair of couplers 22a, 22b have the same structure as to each other, FIGS. 11A and 11B show only one coupler 22a.

In this embodiment, the structural member 20a on which the one coupler 22a is mounted is a tubular truss structural member and formed of, for example, CFRP (Carbon Fiber Reinforced Plastic). However, the structural member 20a may have other shape and may be formed of various materials including various metals, various resins, or combinations thereof. The one coupler 22a may be mounted on only one end portion of the tubular truss structural member or on each of both end portions thereof as a predetermined position of the tubular truss structural member constituting the structural member 20a.

In this embodiment, the structural member 20b on which the other coupler 22b is mounted is a node (tying point) member, and the other coupler 22b is mounted at a predetermined position on the outer peripheral surface of the node (tying point) member.

Each of the pair of couplers 22a, 22b includes a coupler main body 24 formed in a tubular shape. The coupler main body 24 may be formed of various arbitrary materials likewise the structural member 20a. In this embodiment, the above described tubular shape is a cylindrical shape.

A plurality of engaging projections 26 are disposed on the projecting end of the coupler main body 24 and project along the center line C of the cylindrical shape from a plurality of positions spaced apart from each other at predetermined intervals in the circumferential direction of the cylindrical shape.

An engaging hook 28 projects from the projecting end portion of each of the plurality of engaging projections 26 in the predetermined one circumferential direction.

Figure 12:
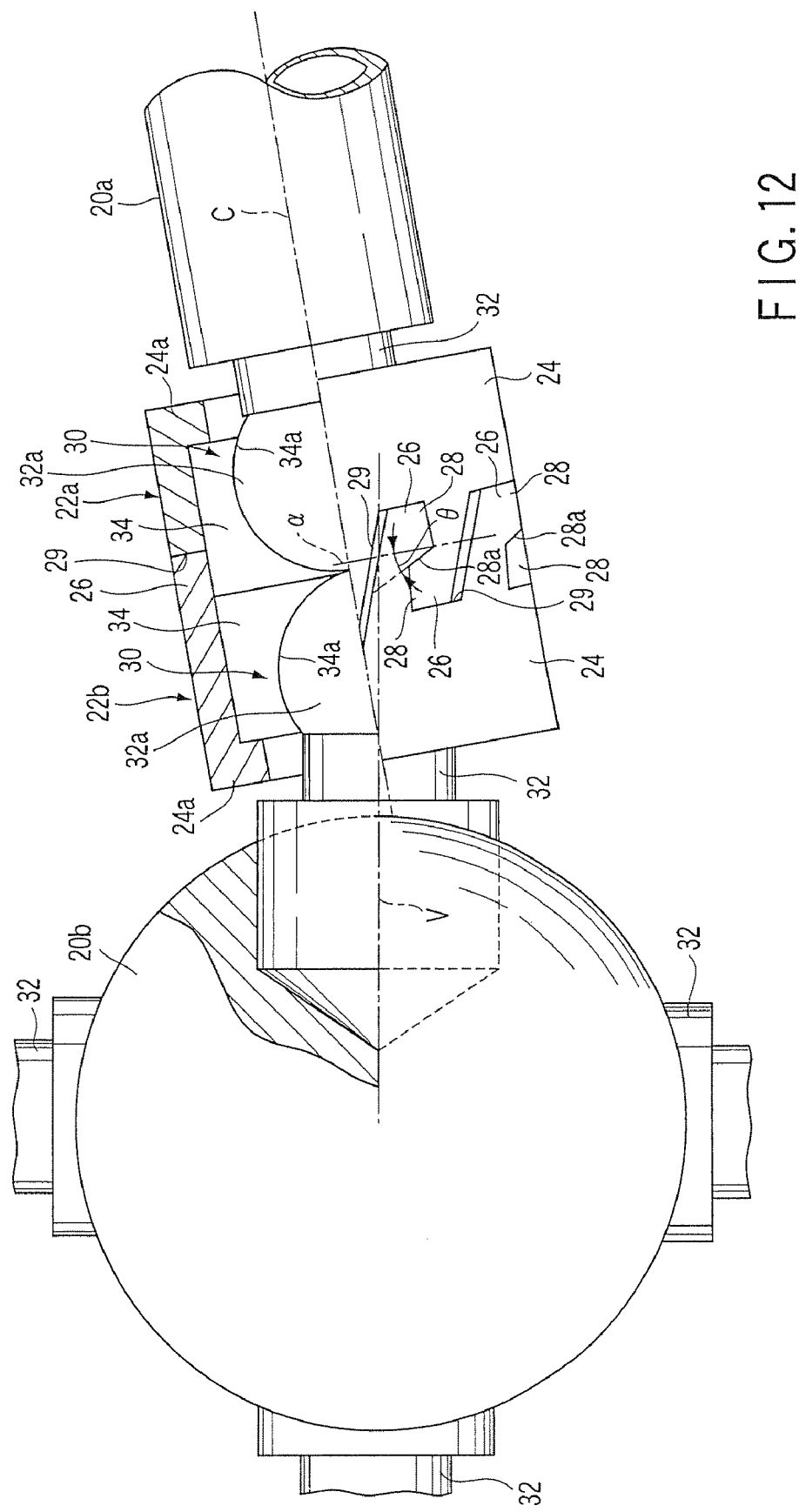
FIG. 12 is a half longitudinal sectional view of the pair of couplers of the coupling apparatus for structural members according to the third embodiment shown in FIGS. 11A and 11B, and schematically shows that the pair of couplers are coupled with each other and coupling direction changing mechanisms of the pair of couplers function.

As shown in FIG. 12, in the pair of couplers 22a, 22b, after the plurality of engaging projections 26 of the coupler main body 24 of the one coupler 22a are inserted into a plurality of engaging recesses 29 between the plurality of engaging projections 26 of the coupler main body 24 of the other coupler 22b, the coupler main body 24 of the one coupler 22a is rotated in the predetermined one circumferential direction with respect to the coupler main body 24 of the other coupler 22b, thereby the plurality of engaging hooks 28 of the plurality of engaging projections 26 of the one coupler 22a are engaged with the plurality of engaging hooks 28 of the plurality of engaging projections 26 of the other coupler 22b in a direction where the couplers 22a, 22b are separated from each other along the center line C.

The engaging hooks 28 of the engaging projections 26 of the coupler main body 24 of each of the couplers 22a, 22b have engaging surfaces 28a which are in contact with each other when the engaging hooks 28 of the engaging projections 26 of the one coupler 22a are engaged with the engaging hooks 28 of the engaging projections 26 of the other coupler 22b. Each engaging surface 28a slants from an imaginary plane α orthogonal to the above center line C toward the projecting end of the engaging projection 26 corresponding to the engaging surfaces 28a.

The slant angle θ is so set that, even if the pair of couplers 22a, 22b are pulled in a direction where they are separated from each other along the center line C while the engaging surfaces 28a of the engaging hooks 28 of the engaging projections 26 of the coupler main bodies 24 of one coupler 22a are engaged with those of the other coupler 22b, the engagement of the engaging surfaces 28a with each other can be stably maintained by friction force exerted on the engaging surfaces 28a engaging with each other. Such a slant angle θ is in a range between, for example, 1 and 2°.

Such a slant angle makes the above described engaging work being easy, also makes the disengaging work being easy, and makes the mutual engagement of the couplers being maintained surely, even if the outside dimensions of each of the engaging projections 26 and those of the engaging hooks 28 of the pair of couplers 22a, 22b are so set that the pair of couplers 22a, 22b do not substantially move a direction along the center lines C thereof while any of compression force and tension force is exerted on the couplers 22a, 22b in the direction along the center lines C thereof after the above described engagement is performed.

The cylindrical coupler main body 24 has an inner flange 24a at the end portion thereof opposite to the projecting end portion where the plurality of engaging projections 26 project in the direction along the center line C.

Each of the pair of couplers 22a, 22b further includes a coupling direction changing mechanism 30 by which the coupler main body 24 can be connected to the predetermined position on the structural member 20a or 20b corresponding to the coupler main body 24 in a state that the center line of the coupler main body 24 directs in a desired direction.

The coupling direction changing mechanism 30 includes a spherical supporting portion 32 and a spherical surface holding portion 34. The spherical supporting portion 32 includes at least a portion 32a of a spherical surface fixed to a predetermined position of the structural member 20a or 20b corresponding to the coupler main body 24 of the coupler 22a or the coupler 22b. The spherical surface holding portion 34 holds at least the portion 32a of the spherical surface of the spherical supporting portion 32, can slide on at least the portion 32a of the spherical surface, and is connected to the coupler main body 24 of the coupler 22a or 22b.

In this embodiment, the spherical surface holding portion 34 is connected to the coupler main body 24 in the inner hole of the coupler main body 24. In order to slidably hold at least the portion 32a of the spherical surface of the spherical supporting portion 32 by the spherical surface holding portion 34, a spherical supporting recess 34a, which is composed of at least a portion of a spherical surface having a diameter substantially similar to that of at least the portion 32a of the spherical surface of the spherical supporting portion 32, must be formed in the spherical surface holding portion 34.

In order to permit at least the portion 32a of the spherical surface of the spherical supporting portion 32 to be easily assembled into the spherical supporting recess 34a of the spherical surface holding portion 34, the spherical surface holding portion 34 in the embodiment is composed of two blocks which are divided along a division plane parallel to the center line C of the coupler main body 24. After the two blocks of the spherical surface holding portion 34 are separated from each other outside of the inner hole of the coupler main body 24, they are covered on at least the portion 32a of the spherical surface of the spherical supporting portion 32 so as to wrap at least the portion 32a of the spherical surface of the spherical supporting portion 32 with the spherical supporting recess 34a. Then, the two blocks are inserted into the inner hole of the coupler main body 24 in this state as shown in FIGS. 11A and 11B and are held in the inner hole. The spherical surface holding portion 34 may be held in the inner hole only by the friction force generated between the inner peripheral surface of the inner hole and the outer peripheral surface of the spherical surface holding portion 34. However, it can be more strongly held by a known fixing means such as an adhesive, a fixing screw, or the like.

Note that the spherical surface holding portion 34 may be composed of a plurality of blocks divided along a plurality of division planes parallel to the center line C of the coupler main body 24.

In the combination of the pair of couplers 22a, 22b of the coupling apparatus of this embodiment, even if, as shown in FIG. 12, the center line C of the coupler main body 24 of the one coupler 22a slants with respect to the normal V at the predetermined position of the other structural member 20b on which the other coupler 22b is mounted, the center line C of the coupler main body 24 of the other coupler 22a is slanted with respect to the normal V at the predetermined position of the other structural member 20b by the coupling direction changing mechanism 30 so that the center line C of the coupler main body 24 of the other coupler 22a aligns with the center line C of the coupler main body 24 of the one coupler 22a. As a result, the pair of couplers 22a, 22b can be coupled with each other, namely, the one structural member 20a can be coupled with the other structural member 20b. Further, even if the outer dimensions of each of the one structural member 20a and the other structural member 20b, in particular, the length thereof along the center line C and the normal V is greatly changed due to thermal expansion, thermal contraction, or the dimensional tolerances of components in manufacture and assembly, the pair of couplers 22a, 22b can be appropriately coupled with each other regardless of the above change by moving the spherical surface holding portion 34 in the inner hole of the coupler main body 24 in a direction along the center line C or the normal V. Accordingly, when the spherical surface holding portion 34 is strongly held in the inner hole by the known fixing means such as the adhesive, the fixing screw, or the like as described above, it is preferable to use the fixing means after the couplers 22a, 22b are appropriately coupled with each other.

Further, there is a case that a construction composed of the structural members 20a, 20b as the components thereof is deformed in its entirely when the temperature of the overall construction is unevenly increased by the heat applied to thereto. In this case, force may be exerted on the structural members 20a, 20b in a direction offset from the relative angle relationship of them when they were firstly assembled or when they are at an ordinary temperature. This is a phenomenon known well as the deformation or the thermal stress of the construction due to the thermal expansion, and the stress, which is exerted on the couplers and the structural members of the construction, is greatly increased unless a special consideration is paid in its design.

Even in this case, however, since the deformation generated in the structural members due to an increase in temperature is absorbed by the slide of the spherical surface holding portion 34 and the spherical supporting portion 32 in the inner hole of the coupler main body 24, a large amount of stress is not exerted on the structural members 20a, 20b.

Further, in this embodiment, the one structural member 20a on which the one coupler 22a is mounted and the other structural member 20b on which the other coupler 22b is mounted are not only independent of each other but also have a different arrangement. However, they may have the same arrangement, namely, the other structural member 20b, for example, may be the same tubular truss structural member as the one structural member 20a.

Fourth Embodiment

Next, a coupling apparatus for structural members according to a fourth embodiment will be described in detail with reference to FIGS. 13A, 13B, 14, and 15.

The coupling apparatus for structural members according to the fourth embodiment of the present invention, like the coupling apparatus for structural members according to the third embodiment of the present invention described above with reference to FIGS. 11A, 11B, and 12, also includes a pair of couplers 42a, 42b that are mounted on the structural members 40a, 40b independent of each other and can be detachably coupled with each other to couple the structural members 40a, 40b with each other. In this embodiment, since the pair of couplers 42a, 42b have the same structure as to each other, FIGS. 13A and 13B show only one coupler 42a.

In this embodiment, the structural member 40a on which the one coupler 42a is mounted is a tubular truss structural member and formed of, for example, CFRP (Carbon Fiber Reinforced Plastic). However, the structural member 40a may have other shape and may be formed of various materials including various metals, various resins, or combinations thereof. The one coupler 42a may be mounted on only one end portion of the tubular truss structural member or on each of both end portions thereof as a predetermined position of the tubular truss structural member constituting the structural member 40a.

In this embodiment, the structural member 40b on which the other coupler 42b is mounted is a node (tying point) member, and the other coupler 42b is mounted at a predetermined position on the outer peripheral surface of the node (tying point) member.

Each of the pair of couplers 42a, 42b includes a coupler main body 44 formed in a tubular shape. The coupler main body 44 may be formed of various arbitrary materials likewise the structural member 40a. In this embodiment, the above described tubular shape is a cylindrical shape.

A plurality of engaging projections 46 are disposed on the projecting end of the coupler main body 44 and project along the center line C of the cylindrical shape from a plurality of positions spaced apart from each other at predetermined intervals in the circumferential direction of the cylindrical shape.

An engaging hook 48 projects from the projecting end portion of each of the plurality of engaging projections 46 in the predetermined one circumferential direction.

Figure 14:
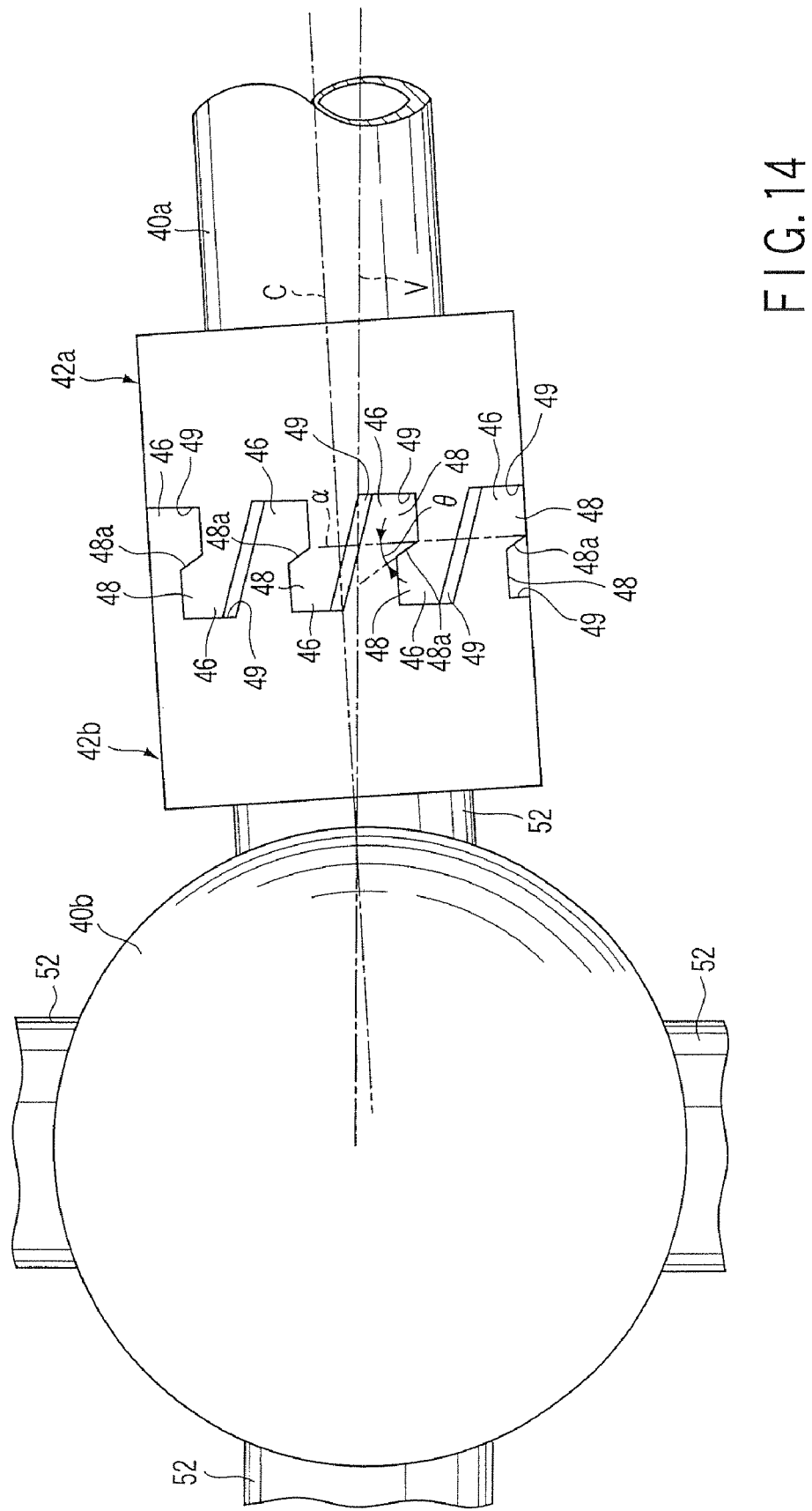
FIG. 14 is a side view schematically showing that the pair of couplers of the coupling apparatus for structural members according to the fourth embodiment and shown in FIGS. 13A and 13B are coupled with each other and coupling direction changing mechanisms of the pair of couplers function.
Figure 15:
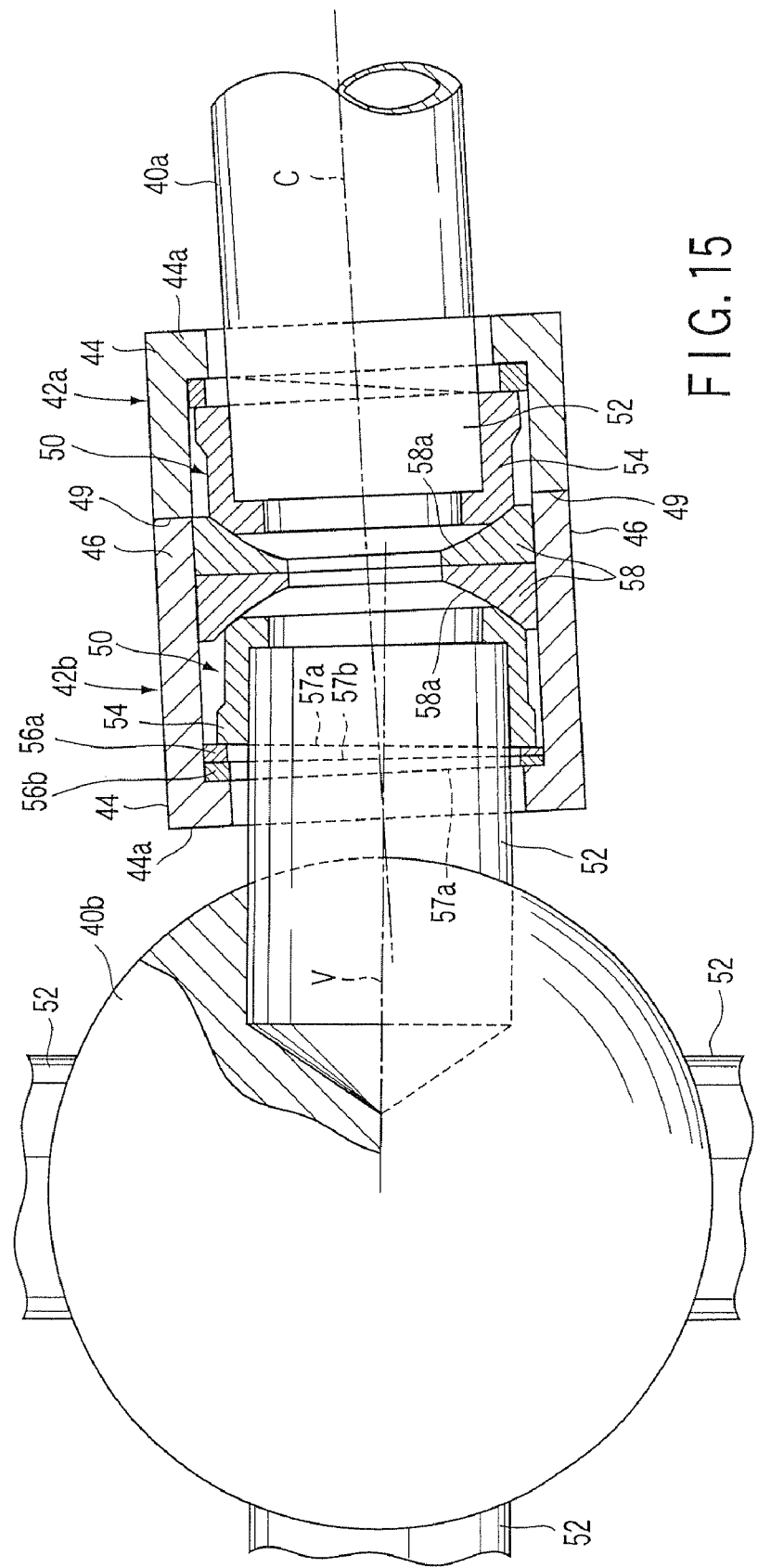
FIG. 15 is a schematic longitudinal sectional view of the pair of couplers of the coupling apparatus for structural members according to the fourth embodiment in the same condition as that in FIG. 14.

As shown in FIGS. 14 and 15, in the pair of couplers 42a, 42b, after the plurality of engaging projections 46 of the coupler main body 44 of the one coupler 42a are inserted into a plurality of engaging recesses 49 between the plurality of engaging projections 46 of the coupler main body 44 of the other coupler 42b, the coupler main body 44 of the one coupler 42a is rotated in the predetermined one circumferential direction with respect to the coupler main body 44 of the other coupler 42b, thereby the plurality of engaging hooks 48 of the plurality of engaging projections 46 of the one coupler 42a are engaged with the plurality of engaging hooks 48 of the plurality of engaging projections 46 of the other coupler 42b in a direction where the couplers 42a, 42b are separated from each other along the center line C.

The engaging hooks 48 of the engaging projections 46 of the coupler main body 44 of each of the couplers 42a, 42b have engaging surfaces 48a which are in contact with each other when the engaging hooks 48 of the engaging projections 46 of the one coupler 42a are engaged with the engaging hooks 48 of the engaging projections 46 of the other coupler 42b. Each engaging surface 48a slants from an imaginary plane α orthogonal to the above center line C toward the projecting end of the engaging projection 46 corresponding to the engaging surfaces 48a.

The slant angle θ is so set that, even if the pair of couplers 42a, 42b are pulled in a direction where they are separated from each other along the center line C while the engaging surfaces 48a of the engaging hooks 48 of the engaging projections 46 of the coupler main bodies 44 of one coupler 42a are engaged with those of the other coupler 42b, the engagement of the engaging surfaces 48a with each other can be stably maintained by friction force exerted on the engaging surfaces 48a engaging with each other. Such a slant angle θ is in a range between, for example, 1 and 2°.

Such a slant angle makes the above described engaging work easy, also makes the disengaging work easy, and makes the mutual engagement of the couplers to be maintained surely, even if the outside dimensions of each of the engaging projections 46 and those of the engaging hooks 48 of the pair of couplers 42a, 42b are so set that the pair of couplers 42a, 42b do not substantially move a direction along the center lines C thereof while any of compression force and tension force is exerted on the couplers 42a, 42b in the direction along the center lines C thereof after the above described engagement is performed.

The cylindrical coupler main body 44 has an inner flange 44a at the end portion thereof opposite to the projecting end portion where the plurality of engaging projections 46 project in the direction along the center line C.

As apparent from the above detailed description, the pair of couplers 42a, 42b according to the fourth embodiment and including the coupler main bodies 44, the plurality of engaging projections 46, the plurality of engaging hooks 48, and the engaging surfaces 48a have the same arrangements as those of the pair of couplers 22a, 22b according to the third embodiment and including the coupler main bodies 24, the plurality of engaging projections 26, the plurality of engaging hooks 28, and the engaging surface 28a as described above.

The fourth embodiment is different from the third embodiment in the arrangement of each of coupling direction changing mechanisms 50 which are additionally provided in the pair of couplers 42a, 42b. The coupling direction changing mechanism 50 can connect the coupler main body 44 to the predetermined position on the structural member 40a or 40b corresponding to the coupler main body 44 in a state that the center line of the coupler main body 44 directs in a desired direction.

Each of the coupling direction changing mechanism 50 includes an entering portion 52 and a diameter-enlarged portion 54 fixed to the entering portion 52. The entering portion 52 is fixed to a predetermined position of the structural member 40a or 40b to which the coupler main body 44 of the couplers 42a or 42b corresponds, and is entered in the inner hole of the coupler main body 44 of the corresponding coupler 42a or 42b.

The coupling direction changing mechanism 50 further includes at least two thickness-changing washers 56a, 56b, which annually extend around the center line C in the inner hole on the side opposite to the entering end of the entering portion 52 with respect to the diameter-enlarged portion 54 and which are disposed side by side in a direction along the center line C of the inner hole. Further, the coupling direction changing mechanism 50 includes a radial direction movement guide portion 58, which is disposed in the inner hole on the entering end side of the entering portion 52 with respect to the diameter-enlarged portion 54 and abutted against the end surface of the diameter-enlarged portion 54 on the entering end side and which permits the diameter-enlarged portion 54 to move in the radial direction of the inner hole.

In each of the at least two thickness-changing washers 56a, 56b, one end surface 57a of the washer in the direction along the center line thereof extends in a direction orthogonal to the center line C, and the other end surface 57b thereof extends in a direction obliquely intersecting the center line C thereof.

A surface 58a of the radial direction movement guide portion 58 against which the end surface of the diameter-enlarged portion 54 on the entering end side thereof is abutted has a concave shape which is recessed in the projecting direction of the entering portion 52.

The diameter-enlarged portion 54 is clamped in the inner hole in the direction along the center line C of the inner hole by the at least two thickness-changing washers 56a, 56b and the radial direction movement guide portion 58. By moving one of the at least two thickness-changing washers 56a, 56b relatively to the other of them in the circumferential direction, the radial direction movement guide portion 58 is moved in the radial direction of the inner hole on the end surface of the diameter-enlarged portion 54 on the entering end side thereof, thereby the coupler main body 44 of the coupler 42a or 42b corresponding thereto can be moved in the radial direction of the inner hole with respect to the projecting end of the entering portion 52. This means that the coupler main body 44, which holds the radial direction movement guide portion 58, slants so as to slant the center line C thereof with respect to the projecting end of the entering portion 52, namely, with respect to the normal V at the above described predetermined position of the structural members 20*a* or 20*b* corresponding thereto.

Note that one of the two thickness-changing washers 56*a*, 56*b* can be moved in the circumferential direction relatively to the other of them by, for example, the following manner. That is, a not shown washer operating slot, which extends a predetermined length in the circumferential direction of an outer peripheral wall of the coupler main body 44, is previously formed in the outer peripheral wall in a portion corresponding to the outer peripheral surface of the one of the two thickness-changing washers 56*a*, 56*b*, and further a not shown tool hook depression is previously formed in the outer peripheral surface of the one of the two thickness-changing washers 56*a*, 56*b*. Then, a not shown tool is inserted into the not shown washer operating slot, and the inserting end of the not shown tool is hooked in the tool hook depression of the outer peripheral surface of the one of the two thickness-changing washers 56*a*, 56*b*, thereby the one of the thickness-changing washers 56*a*, 56*b* can be moved in the circumferential direction relatively to the other thereof by the not shown tool.

Further, by simultaneously moving both the two thickness-changing washers 56*a*, 56*b* in the circumferential direction, the direction in which the coupler main body 44, which holds the radial direction movement guide portion 58, slants its center line C with respect to the projecting end of the entering portion 52, namely, with respect to the normal V at the predetermined positions of the corresponding structural member 20*a* or 20*b*, can be arbitrarily set.

Both the two thickness-changing washers 56*a*, 56*b* can be simultaneously moved in the circumferential direction by, for example, the following manner. That is, a not shown washer operating slot, which extends a predetermined length in the circumferential direction of the outer peripheral surface of the coupler main body 44, is also previously formed in the outer peripheral wall of the coupler main body 44 in a portion corresponding to the outer peripheral surface of the other of the two thickness-changing washers 56*a*, 56*b*, and further a not shown tool hook depression is also previously formed in the outer peripheral surface of the other of the two thickness-changing washers 56*a*, 56*b*. Then, not shown tools are inserted into the two not shown washer operating slots, and the inserting ends of the not shown tools are hooked in the tool hook depressions in the outer peripheral surfaces of both the two thickness-changing washers 56*a*, 56*b*, thereby both the thickness-changing washers 56*a*, 56*b* are simultaneously moved in the circumferential direction by the not shown tools.

The two thickness-changing washers 56*a*, 56*b* and the radial direction movement guide portion 58 may be held in the inner hole only by the friction force generated between the inner peripheral surface of the inner hole and each of the outer peripheral surfaces of thickness-changing washers 56*a*, 56*b* and the radial direction movement guide portion 58. However, they can be more strongly held by a known fixing means such as an adhesive, fixing screw, or the like.

In the combination of the pair of couplers 42*a*, 42*b* of the coupling apparatus of this embodiment, even if, as shown in FIGS. 14 and 15, the center line C of the coupler main body 44 of the one coupler 42*a* slants with respect to the normal V at the predetermined position of the other structural member 40*b* on which the other coupler 42*b* is mounted, the center line C of the coupler main body 44 of the other coupler 42*a* is slanted with respect to the normal V at the predetermined position of the other structural member 40*b* by the coupling direction changing mechanism 50 so that the center line C of the coupler main body 44 of the other coupler 42*a* aligns with the center line C of the coupler main body 44 of the one coupler 42*a*. As a result, the pair of couplers 42*a*, 42*b* can be coupled with each other, namely, the one structural member 40*a* can be coupled with the other structural member 40*b*. Further, even if the outer dimensions of each of the one structural member 40*a* and the other structural member 40*b*, in particular, the length thereof along the center line C and the normal V is greatly changed due to thermal expansion, thermal contraction, or the dimensional tolerances of components in manufacture and assembly, the pair of couplers 42*a*, 42*b* can be appropriately coupled with each other regardless of the above change by the following manners. That is, by interposing a not shown annular bag, in which a gel-like material having a very small amount of thermal expansion and thermal contraction is hermetically sealed, between the inner flange 44*a* of the coupler main body 44 and the two thickness-changing washers 56*a*, 56*b* or by composing the radial direction movement guide portion 58 of a bag in which a gel-like material having a very small amount of thermal expansion and thermal contraction is hermetically sealed, the change of the outer dimensions due to the thermal expansion and the thermal contraction is absorbed by the gel-like material.

Further, there is a case that a construction composed of the structural members 40*a*, 40*b* as the components thereof is deformed in its entirety when the temperature of the overall construction is unevenly increased by the heat applied thereto. In this case, force may be exerted on the structural members 40*a*, 40*b* in a direction offset from the relative angle relationship of them when they were firstly assembled or when they are at an ordinary temperature.

In this case, to prevent generation of a large amount of stress and deformation in the structural members 40*a*, 40*b*, an annular bag, in which a gel-like material having a very small amount of thermal expansion and thermal contraction is hermetically sealed, or a packing of, for example, silicone rubber, fluororubber, or the like may be interposed between each of the structural members 40*a*, 40*b* and the two thickness-changing washers 56*a*, 56*b*. Otherwise, the above thermal deformation can be absorbed by installing an annular bag, in which a gel-like material having a very small amount of thermal expansion and thermal contraction is hermetically sealed, a thermoplastic resin, or an elastic material, for example, silicone rubber, fluororubber in place of the thickness-changing washers 56*a*, 56*b*.

Further, in a case that the thickness-changing washers 56*a*, 56*b* are composed of a thermoplastic resin, not shown heaters are disposed therein. And, when the construction is deformed in their entireties by an uneven increase in temperature therein, the thermoplastic resin is softened by using the heaters so that the relative angle relationship between the structural members 40*a*, 40*b* can be easily changed and the deformation of the construction due to the uneven increase in temperature therein can be absorbed.

When the two thickness-changing washers 56*a*, 56*b* and the radial direction movement guide portion 58 are strongly held in the inner hole by the known fixing means such as the adhesive, fixing screw, or the like as described above, it is preferable to use the fixing means after the pair of couplers 42*a*, 42*b* are appropriately coupled with each other.

Further, when the thickness-changing washers 56*a*, 56*b* and the radial direction movement guide portion 58 are composed a thermosetting resin or a photo-setting resin, it is preferable to set the resin by applying heat or light thereto after the pair of couplers 42*a*, 42*b* are coupled with each other.

Further, also in this embodiment, the one structural member 40a on which the one coupler 42a is mounted and the other structural member 40b on which the other coupler 42b is mounted are not only independent of each other but also have a different arrangement. However, they may have the same arrangement as to each other, namely, the other coupler 42b, for example, may be composed of the same tubular truss structural member as the one structural member 40a.

[Modifications]

In the third embodiment described above with reference to FIGS. 11A, 11B, and 12, each of the pair of couplers 22a, 22b includes the coupling direction changing mechanism 30. However, at least one of the pair of couplers 22a, 22b may include the coupling direction changing mechanism 30.

Figure 16:
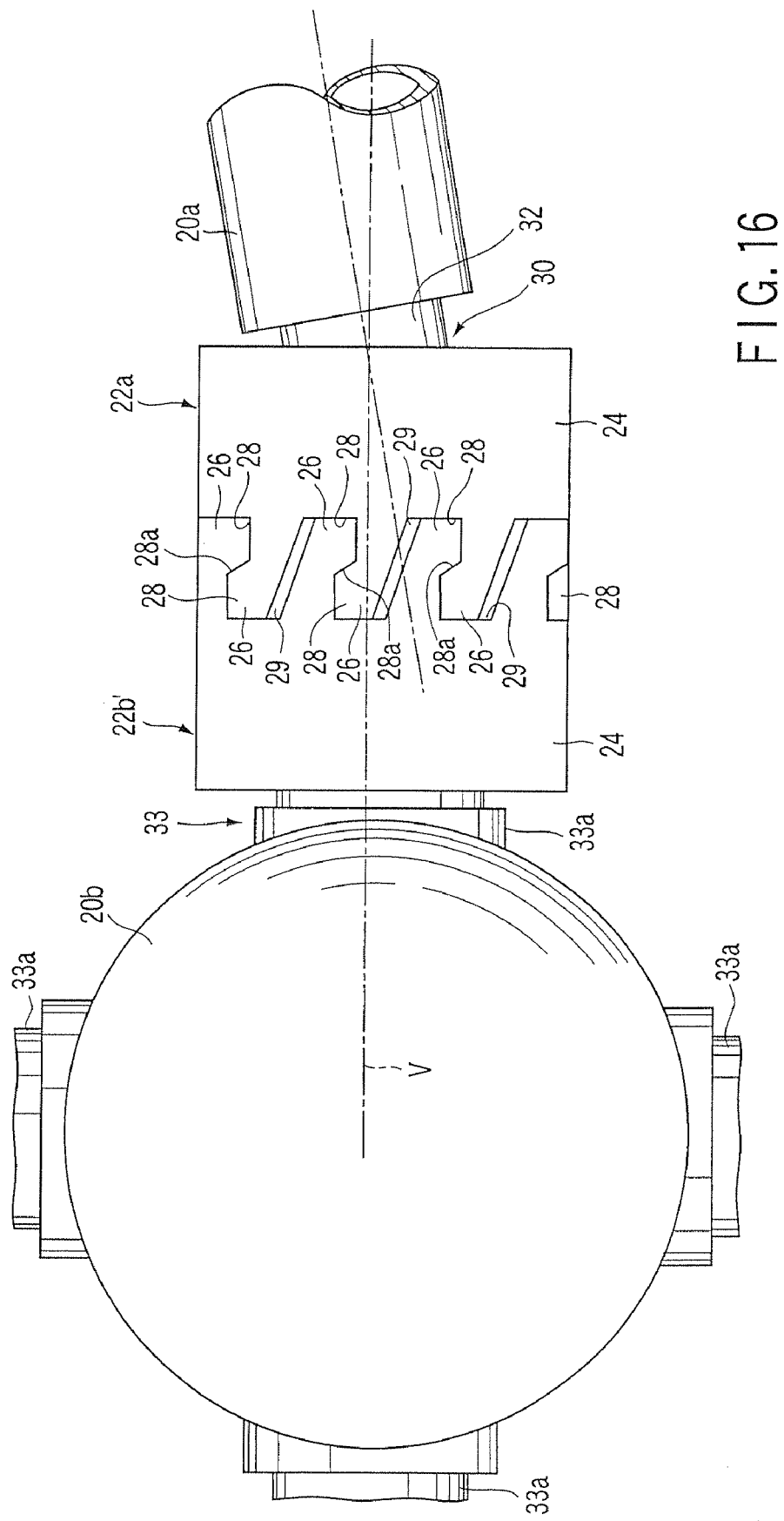
FIG. 16 is a side view of a modification of the pair of couplers of the coupling apparatus for structural members according to the third embodiment shown in FIGS. 11A and 11B and schematically shows that the pair of couplers are coupled with each other and a coupling direction changing mechanism provided with only one of the pair of couplers functions.
Figure 17A:
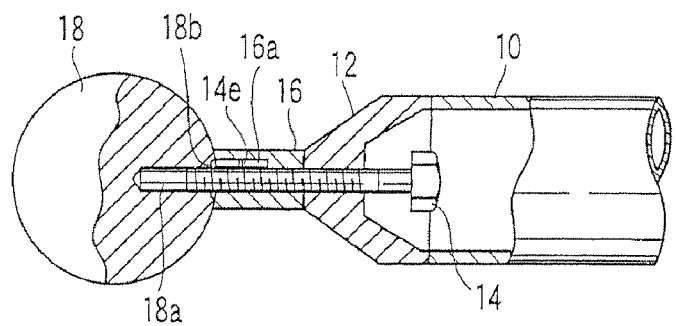
FIG. 17A schematically shows a main portion of a conventional coupling apparatus in an enlarged cross section.
Figure 17B:
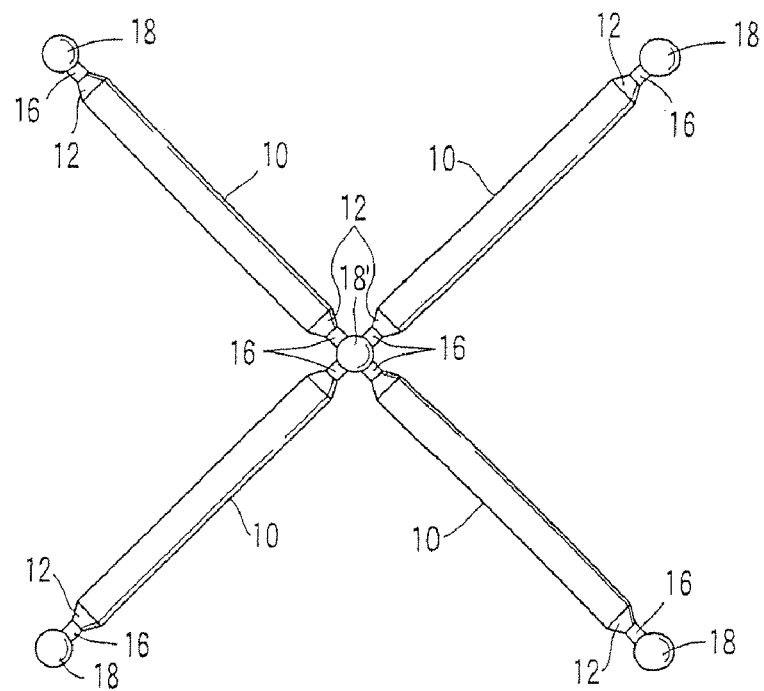
FIG. 17B is a view schematically showing that four structural members independent of each other are coupled with each other by the conventional coupling apparatus for structural members shown in FIG. 16A.
Figure 17C:
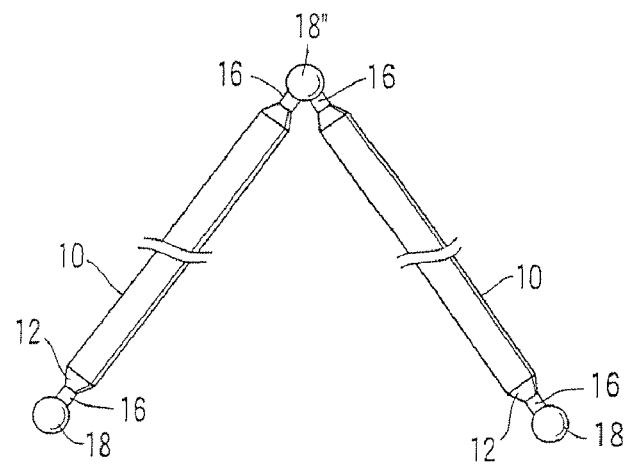
FIG. 17C is a view schematically showing that two structural members independent of each other are coupled with each other by the conventional coupling apparatus for structural members shown in FIG. 17A.

FIG. 16 shows a state that the one coupler 22a provided with the coupling direction changing mechanism 30 is coupled with the other coupler 22b' not provided with the coupling direction changing mechanism 30, and the other coupler 22b' is mounted at the predetermined position on the structural member 20b corresponding thereto with a fixing support portion 33a of a coupling direction fixing mechanism 33. The coupling direction fixing mechanism 33 cannot slant the coupler 22b' with respect to the normal V at the above predetermined position. FIG. 16 also shows a state that the one structural member 20a, which is coupled with the one coupler 22a with the coupling direction changing mechanism 30, slants with reference to the normal V at the predetermined position of the other structural member 20b.

Note that the fixing support portion 33a of the coupling direction fixing mechanism 33 can be rotated in the inner hole of the coupler main body 24 of the other coupler 22b' in the circumferential direction of the inner hole, and can be moved in the inner hole in the direction along the center line C of the inner hole. And, the rotation of the fixing support portion 33a of the coupling direction fixing mechanism 33 in the circumferential direction and the movement thereof in the direction along the center line can be arbitrarily fixed by using a known fixing means, for example, a fixing screw, an adhesive, or the like to the coupler main body 24 of the other coupler 22b'.

In the fourth embodiment described above with reference to FIGS. 13A, 13B, and 15, each of the pair of couplers 42a, 42b includes the coupling direction changing mechanism 50. However, at least one of the couplers 42a, 42b may include the coupling direction changing mechanism 50.

Also, in this case, the other of the pair of couplers 42a, 42b is mounted at the predetermined position of the structural member corresponding thereto with the fixing support portion of the coupling direction fixing mechanism. The coupling direction fixing mechanism cannot slant the other coupler with respect to the normal at the above predetermined position.

The fixing support portion of the coupling direction fixing mechanism, which is applied to the other of the pair of couplers 42a, 42b of the fourth embodiment, can be rotated in the inner hole of the coupler main body of the other coupler in the circumferential direction of the inner hole, and can be moved in the inner hole in the direction along the center line of the inner hole. The rotation of the fixing support portion of the coupling direction fixing mechanism in the circumferential direction and the movement thereof in the direction along the center line can be also arbitrarily fixed by using the known fixing means, for example, the fixing screw, the adhesive, or the like to the coupler main body of the other coupler.

Note that the coupling direction changing mechanism 30, which is employed in at least one of the pair of couplers 22a, 22b, and the coupling direction changing mechanism 50, which is employed in at least one of the pair of couplers 42a, 42b, in the coupling apparatuses according to the third and fourth embodiments, can be employed in at least one of the pair of couplers 60a, 60b and at least one of the pair of couplers 110a, 100b of the coupling apparatuses according to the first and second embodiments described above and in both the pair of couplers 60a, 60b and both the pair of couplers 100a, 100b.

As apparent from the above detailed description, the coupling apparatus for structural members according to the present invention is simple in structure and can make assembling and disassembling work of the construction easy while the assembling and disassembling work is performed in the unstable environment, such as on the body floating on water, or in underwater, aerospace, or the like. Further, the coupling apparatus for structural members according to the present invention is simple in structure, can make assembling and disassembling work of the construction easy even if the assembling and disassembling work is performed in the unstable environment such as on the body floating on water or underwater, aerospace, or the like, and even if the assembling and disassembling work is performed in the environment where the construction is exposed to high temperature and low temperature for a long time period, and further prevents the construction from generating a large amount of deformation and stress due to temperature expansion and temperature contraction. Therefore, the coupling apparatus for structural members according to the present invention is appropriately used to assemble a large roofed construction, for example a dome, used on land and a construction used on water, underwater, or aerospace.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A coupling apparatus for connecting structural members, said coupling apparatus comprising:
   a first coupler half and second coupler half defining an axial direction therethrough;
   each coupler half having an inner coupler main body sleeve and outer coupler main body sleeve, each said sleeve having a plurality of axial projections equally spaced on a circumferential end thereof, each axial projection having an engaging hook at a distal end thereof, each said sleeve rotatably mountable on one of the structural members, said inner sleeve of said each coupler half being received within said outer sleeve of said each coupler half, each coupler half having a biasing spring connecting said inner sleeve to said outer sleeve and biasing said inner sleeve and said outer sleeve in opposite circumferential biasing directions with respect to each other;
   wherein, said coupling apparatus is coupled when said plurality of axial projections of said first coupler half are inserted in said axial direction between said plurality of axial projections of said second coupler half, said circumferential biasing directions of said inner sleeves being opposite with respect to each other, and said circumferential biasing directions of said outer sleeves being opposite with respect to each other, such that said engaging hooks of said first coupler half are circumferentially locked with said engaging hooks of said second coupler half; and wherein said coupling apparatus is decoupled when said inner sleeves are rotated in circumferential directions that are opposite to said inner sleeve biasing directions thereby unlocking said first coupler half hooks from said second coupler half hooks and allowing separation of the first coupler half from the second coupler half in said axial direction.

2. The coupling apparatus for connecting structural members according to claim 1, wherein each coupler half further has a wedge which fixes a position of the outer coupler main body sleeve and a position of the inner coupler main body sleeve with respect to a corresponding one of the structural members in a direction along a center line of each coupler main body sleeve in a state that the of coupler halves are coupled with each other.

3. The coupling apparatus for connecting structural members according to claim 1, wherein each coupler half further has an alignment member which is disposed within the inner coupler main body sleeve and aligns a center line of each coupler main body sleeve with a center line of a corresponding one of the structural members.

* * * * *